(12) United States Patent
Reiss

(10) Patent No.: US 12,034,617 B2
(45) Date of Patent: Jul. 9, 2024

(54) VISUALIZATION MAPPING OF NETWORK TRAFFIC TELEMETRY

(71) Applicant: ADTRAN, Inc., Huntsville, AL (US)

(72) Inventor: Randel Reiss, Springfield, OR (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 17/709,035

(22) Filed: Mar. 30, 2022

(65) Prior Publication Data

US 2023/0318946 A1    Oct. 5, 2023

(51) Int. Cl.
*H04L 43/045* (2022.01)
*H04L 43/028* (2022.01)
*H04L 43/062* (2022.01)
*H04L 43/067* (2022.01)

(52) U.S. Cl.
CPC .......... *H04L 43/045* (2013.01); *H04L 43/028* (2013.01); *H04L 43/062* (2013.01); *H04L 43/067* (2013.01)

(58) Field of Classification Search
CPC ... H04L 43/045; H04L 43/028; H04L 43/062; H04L 43/067; H04L 43/08
See application file for complete search history.

(56) References Cited

U.S. PATENT DOCUMENTS

| | | | |
|---|---|---|---|
| 2012/0155255 A1* | 6/2012 | Gerber | H04W 24/08 370/230 |
| 2013/0232433 A1* | 9/2013 | Krajec | G06F 11/302 715/771 |
| 2016/0105325 A1* | 4/2016 | Fletcher | G06F 3/0482 715/737 |
| 2017/0093645 A1* | 3/2017 | Zhong | H04L 41/12 |

(Continued)

FOREIGN PATENT DOCUMENTS

WO    WO 2021/049383    3/2021

OTHER PUBLICATIONS

Alexander Zai and Brandon Brown, Deep Reinforcement Learning in Action, Mar. 2020, URL retrieved via: https://livebook.manning.com/concept/deep-learning/state-action-pair (Year: 2020).*

(Continued)

*Primary Examiner* — Schquita D Goodwin
(74) *Attorney, Agent, or Firm* — Fish & Richardson P.C.

(57) ABSTRACT

Methods, systems, and apparatus, including computer programs encoded on computer storage media, for visualizing network data. In some implementations, a server receives a query for network traffic playback data of network devices. The server extracts data from the query. The server obtains historical network traffic data. The server generates the network playback data by: (i) obtaining a plurality of historical network traffic elements from the historical network traffic data associated with a network device, (ii) obtaining state transitional data for each historical network traffic element of the plurality of historical network traffic elements, (iii) determining whether the state transitional data for each historical network traffic element comprises the prior state, and (iv) in response to determining the state transitional data comprises the prior state, the server appends the state transitional data to the network playback data. The server filters and provides the network playback data.

21 Claims, 10 Drawing Sheets

(56) References Cited

U.S. PATENT DOCUMENTS

| | | | | |
|---|---|---|---|---|
| 2017/0310566 A1* | 10/2017 | Aly Salama | .......... | H04L 43/045 |
| 2018/0062956 A1* | 3/2018 | Schultz | .............. | H04L 41/0806 |
| 2019/0043228 A1* | 2/2019 | Bhat | .................. | G06F 3/04847 |
| 2021/0266781 A1* | 8/2021 | Alkurd | ................ | H04L 41/0823 |
| 2022/0172076 A1* | 6/2022 | Kanza | .................... | G06N 3/044 |

OTHER PUBLICATIONS

International Search Report and Written Opinion in International Appln. No. PCT/US2023/064943, dated Jun. 26, 2023, 14 pages.

\* cited by examiner

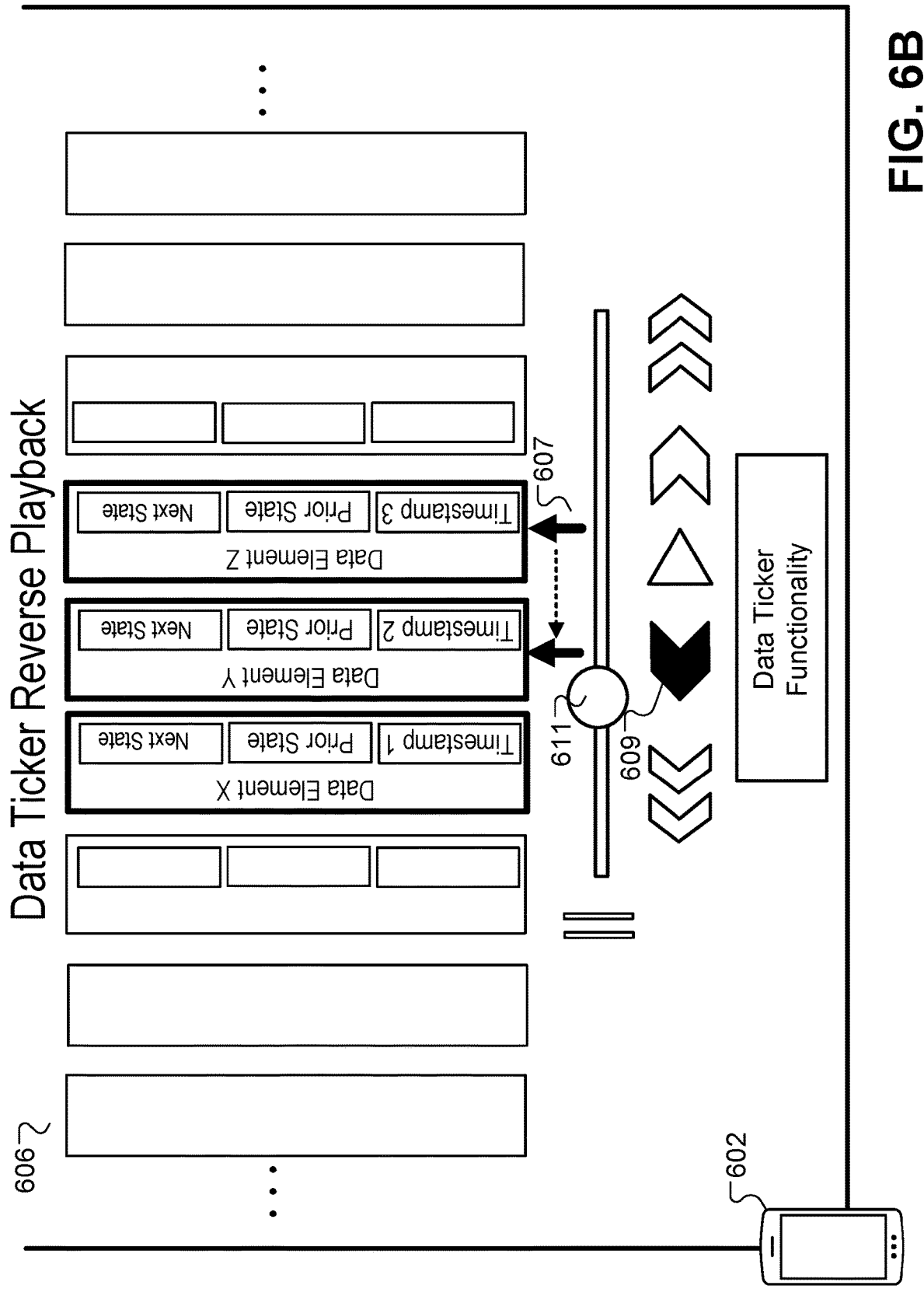

VISUALIZATION MAPPING OF NETWORK TRAFFIC TELEMETRY

TECHNICAL FIELD

This specification generally relates to visual playback, and one particular implementation relates to visual playback of network traffic data transmitted over a communications network.

BACKGROUND

Network traffic can represent an amount of data moved across network devices over a given point in, or period of, time. The data can move as one or more packets between routers, servers, computers, and other devices. For example, when a transmitting device desires to send a message to a receiving device, the transmitting device sends the message as one or more packets to the receiving device over various network devices. The receiving device can reassemble the packets upon receipt for presenting the message in an understandable manner.

SUMMARY

The subject matter described in this specification relates to a system that can provide real-time playback of network traffic data. The system can monitor network traffic across various network devices over a period of time. The network devices can be spanned across various geographic regions and associated with different services. As the network traffic is transmitted between various network devices, the network traffic can be monitored at each network device. The system can monitor traceroute activity, network latency, network speed, and other network activity, to name some examples. Moreover, the system can store data indicative of the network traffic associated with each network device based on a delta-encoding scheme. The delta-encoding scheme enables the system to store large amounts of data indicative of the network traffic in a minimized fashion to reduce the overall memory footprint relative to traditional data management techniques, which reduces the amount of memory required to store the network traffic data, makes the system more responsive to inquiries, and enables faster access to insights related to the network traffic data.

Specifically, the delta-encoding scheme can store state changes of network traffic that satisfy a particular limit. The state changes can include (i) a prior state value and (ii) a next state value, the prior and next state values associated with each network device. An implementer of the system can designate the limit or the system can learn an optimized value for the limit over time. By storing network traffic using the delta-encoding scheme, the system can reduce the memory footprint of the network traffic and reproduce the prior activity of network traffic upon request at a later point in time.

Typically, systems store all network traffic values associated with network devices, which can require an extremely large amount of storage space. However, the system described in this specification can store state changes based on the delta-encoding scheme that satisfies the particular limit. For example, instead of storing a network latency value of a particular network device at each time instance, the system can store a prior state value and a next state value when the network latency value changes by a value greater than 3 milliseconds (ms). Assuming the network latency at a particular network device is 1 ms, 2 ms, 3 ms, 2 ms, and 4 ms at each time instance, then the system would only store the network latency at 1 ms at the first time instance and no other network latencies because the delta between the subsequent values do not change by more than 3 ms. As such, the system here reduces the overall memory consumption footprint by a factor of 5. Other examples of this scenario are also possible.

In some implementations, a user may request to view the network traffic data from one or more network devices over a previous time period. Knowing the state or prior states of network devices can be of critical importance to orient operations and engineering staff seeking to debug an issue with a network, for example. However, many problems are transient or are resolved prior to the point in time when a relevant resource is brought to the situation. Typical real-time displays cannot offer operations and/or engineering staff an ability to see what the network looked like at a prior point in time, e.g., middle of night or over the weekend, or any prior state that might illustrate a precursor to a network issue, such as a network outage. As such, by storing network traffic based on the delta-encoding scheme, the system can prepare prior network data to be replayed in a playback manner. For example, when a user requests to see network traffic from a prior time, such as during a previous night to diagnose an issue with the network, the system can prepare the prior network traffic data in a streamlined playback form, which is an improvement over traditional network monitoring systems. Moreover, the request to see network traffic can provide a high resolution of user selectable playback time ranges or other resolutions of different playback moments. Additionally, the user can select from various time ranges and force playbacks from the beginning of long recorded sequences of data.

The streamlined playback form enables a user to view and interact with the network traffic data in a forward and reverse manner without burdening memory or performance. Specifically, the system can acquire the stored network traffic data and implement a forced reverse delta encoding process to prepare the network traffic for forward and reverse playback. The forced reverse delta encoding process works by sorting the network traffic data based on a characteristic in chronological order. The characteristic can include, for example, date and time, network traffic amounts, and some other amount. The network traffic data is associated with each network device and can include multiple prior states, next states, and corresponding timestamps. Then, the system checks to see whether elements of each network traffic include a prior state. The prior states of each element ensure the user is able to perform the reverse process during the visual playback. If a prior state does not exist for one or more elements, then the system can search through all of the stored network traffic data to see if the prior state exists for the particular network device. If the prior state is found, the system can store identified prior state as the prior state for the missing network traffic data element. If the prior state is not found, then the system can store the next state as the prior state. This copying ensures continuity between network traffic data elements. In response to executing the forced reverse delta process, the system can filter the network traffic playback data based on the user constraints provided in the request.

In some implementations, the system can extract various data components out of the request for filtering. The request can include a prior time range, various network devices to be analyzed, and locational data. The system can compare the generated network traffic playback data to each of the components included in the request. The system adds data in the generated network traffic playback data that falls within the components of the request to a data ticker. Similarly, the system discards data in the generated network traffic playback data that falls outside of the components of the request.

The system uses the data ticker for intended playback display. In some implementations, the data ticker can display the generated network traffic playback data. The data ticker can include a software component which a server displays at a display screen or transmits to a client device for display. During the playback, a user can interact with the data ticker by controlling the playback of the generated network traffic playback data by either moving forward or backward and setting a desired speed. Moreover, the data ticker displays imagery, e.g., images or video, of the generated network traffic playback data by reading the prior and next states of the data elements based on the user's selection of moving forward or backward. The data ticker can either increment or decrement a pointer that is currently set to the state being displayed. During the display of the network activity, the generated network traffic playback data can also display different geographical features, which may be useful in understanding the context of network issues. For example, the different geographical features can include weather, lightning strikes, forest fires, and earthquakes to name a few examples. In other examples, the different geographical layers can also include power outage and satellite orbits. The power outage and the satellite orbits data can be mapped against network status data. The data ticker can overlay the different geographical features during the display of the prior network traffic data to aid the user's visual in potentially understanding a context of the network activity.

In some implementations, the data ticker can interpolate between network state values when a difference amount for a set of network state values satisfy a threshold. As the data ticker displays the network traffic at each state instant, the data ticker can determine a value of the next subsequent state and a corresponding prior state. If the values between these states differ by a threshold amount, then the data ticker can interpolate between these values by adding a new set of subsequent values between these states to create a smoother transition between states. The interpolation ensures the data ticker does not display sharp differences between state values.

In one general aspect, a method performed by a server. The method includes: receiving, by a server and from a client device, a query for network traffic playback data of one or more network devices; extracting, by the server, data from the query that characterizes prior network traffic for the one or more network devices; obtaining, by the server, historical network traffic data associated with the one or more network devices; generating, by the server, the network traffic playback data using the historical network traffic data and the extracted data from the query by: for each network device of the one or more network devices: obtaining, by the server, a plurality of historical network traffic elements from the historical network traffic data associated with the network device; obtaining, by the server, state transitional data for each historical network traffic element of the plurality of historical network traffic elements, wherein the state transitional data comprises (i) a timestamp and at least one of (ii) a prior state element or (iii) a next state element; determining, by the server, whether the state transitional data for each sorted historical network traffic element comprises the prior state element; and in response to determining the state transitional data comprises the prior state element, appending, by the server, the state transitional data to the network traffic playback data; filtering, by the server, the network traffic playback data using the extracted data from the query; and providing, by the server, the filtered network traffic playback data to the client device for multidirectional visual playback.

Other embodiments of these and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes wherein the data from the query comprises locational data, an identifier for each of the one or more network devices, and a time range.

In some implementations, the method includes wherein the time range comprises a prior period to a current time and can include a predetermined length of time.

In some implementations, the method includes in response to obtaining the plurality of historical network traffic elements from the historical network traffic data associated with the network device, sorting, by the server, the plurality of historical network traffic elements by a first characteristic.

In some implementations, the method includes: in response to determining that the state transitional data does not comprise the prior state element, searching, by the server, the plurality of historical network traffic elements for the prior state element associated with the historical network traffic element; in response to determining that the plurality of historical network traffic elements does not include the prior state element, the method comprises: copying, by the server, a current state of the historical network traffic element to the prior state element; and appending, by the server, the state transitional data to the network traffic playback data.

In some implementations, the method includes: in response to determining that the state transitional data does not comprises the prior state element, searching, by the server, the plurality of historical network traffic elements for the prior state element associated with the historical network traffic element; in response to determining that the plurality of historical network traffic elements does include the prior state element, the method comprises: copying, by the server, the prior state element from the plurality of historical network traffic elements to the prior state element for the historical network traffic element; and appending, by the server, the state transitional data to the network traffic playback data.

In some implementations, the method includes wherein providing the filtered network traffic playback data to the client device for the multidirectional visual playback further includes: displaying, by the server, the filtered network traffic playback data to the client device; receiving, by the client device, user input that specifies a direction to move the displayed network traffic playback data, wherein the direction comprises an increment or a decrement in time of the filtered network traffic playback data; adjusting, by the client device, the displayed network traffic playback data based on the received user input; determining, by the client device, whether interpolation is required based on an amount of transition between a prior state and a next state of a historical network traffic element of the displayed network traffic playback data; and in response to determining that interpolation is not required, displaying, by the client device, a current state of the historical network traffic element of the displayed network traffic playback data.

In some implementations, the method includes wherein determining whether interpolation is required based on the amount of transition between the prior state and the next state of the historical network traffic element of the displayed network traffic playback data further includes: comparing, by the client device, the amount of transition between the prior state and the next state of the historical network traffic element to a threshold value; in response to determining that the amount of transition satisfies the threshold value, determining, by the client device, that interpolation is required; or in response to determining that the amount of transition does not satisfy the threshold value, determining, by the client device, that interpolation is not required.

In some implementations, the method includes wherein in response to determining that interpolation is required, the method includes: determining, by the client device, a set number of states between the prior state and the next state of the historical network traffic element; and displaying, by the client device, the set number of state between the prior state and the next state for the historical network traffic element.

In some implementations, the method includes wherein the multidirectional visual playback enables the filtered network traffic playback data to be played in a forward manner, a backward manner, a forward speed, and a backward speed.

In some implementations, the method includes wherein the filtered network traffic playback data can include traceroute activity, network latency, network speeds, and network bandwidth.

In some implementations, the method includes wherein the filtered network traffic playback data can include wind speed data, temperature data, fire data, earthquake data, power outage data, satellite orbit data, and other geological data.

The subject matter described in this specification can be implemented in various embodiments and may result in one or more of the following advantages. In particular, the system can reduce the amount of network traffic stored by storing the deltas between subsequent network activities. By storing the deltas of network traffic for various network devices, the system reduces the overall memory consumption and the system can rely on the delta-encoding scheme to generate a streamlined playback format. The streamlined playback format enables a user to view prior network traffic associated with various network devices. Specifically, a user can view the streamlined-playback of network activity by reversing through the data and by traversing forward through the data. As such, the techniques discussed herein provide more flexible interaction with the network activity data than traditional network monitoring systems, and provide new ways of visualizing network traffic data as it changes over time.

In this case, the system offers a variety of benefits. For example, should an engineer monitoring a networking system notice a network outage from a prior night, the engineer can rely on this system to determine network activity events and potential weather events that led up to and/or caused the network outage. In another example, an internet service provider may be relying on a particular Internet exchange data vendor for internet accessibility. This system can illustrate the network activity using the streamlined playback format to the internet service provider, and the internet service provider may notice network traffic issues with specific network devices managed by the internet exchange data vendor. In this case, the internet service provider can identify and resolve causes of the issues with their network.

In another example, the system can operate independently of the underlying model. Specifically, while a user can interface with the streamlined-playback of network activity, the system enables a variety of functions to be performed simultaneously. For example, a user can interact with the playback to play the network data, e.g., move the network data forward or in reverse, or pause the network data while simultaneously interacting with the map functionality. Interacting with the map functionality can include scrolling, zooming, place in perspective, turning on/off additional visualized layers, e.g., different weather, and activating device filters, e.g., various device values, while the playback is occurring. This simultaneous playback with map interaction is an advantage that enables users to view playback data in a variety of different manners.

In some implementations, the system described in this specification can work in a variety of applications that use large amounts of dynamic data that need to be visually played back. For example, the applications can include networking, airplane traffic control, ship movements on the sea, satellites and their corresponding orbits, and military assets movements. Additionally, the system can track data related to each of these applications such as, for example, moving cargo transport, tracking satellite movement over a period of time, and monitoring vehicular traffic over various roadways and intersections.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 6A-6B are block diagrams that illustrate examples of forward and reverse traversal through network traffic data during the display of the network traffic data.

Like reference numbers and designations in the various drawings indicate like elements. The components shown here, their connections and relationships, and their functions, are meant to be examples only, and are not meant to limit the implementations described and/or claimed in this document.

DETAILED DESCRIPTION

Figure 1:
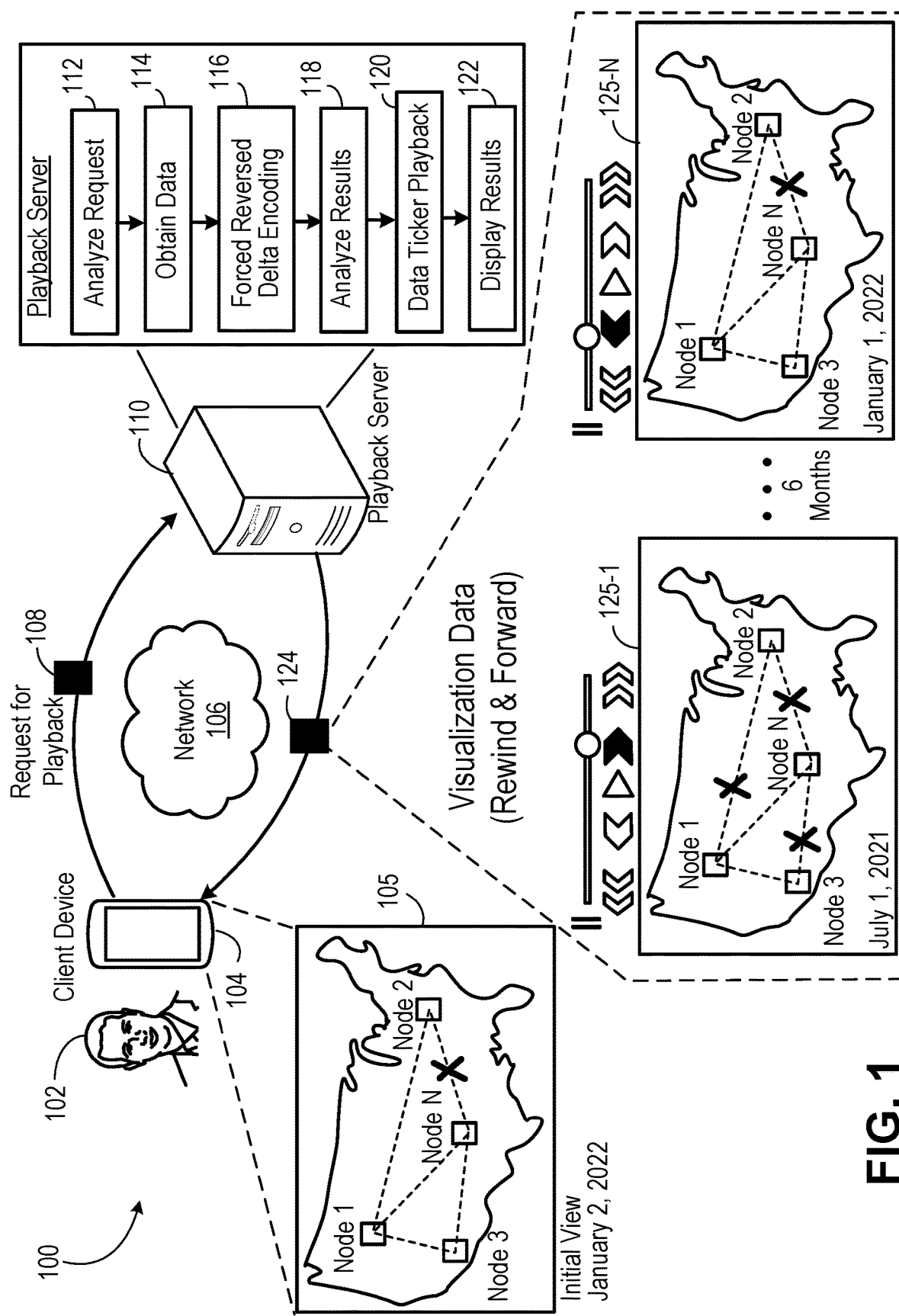
FIG. 1 is a block diagram that illustrates an example of a system for providing visual playback of network traffic data.

FIG. 1 is a block diagram that illustrates an example of a system 100 for providing visual playback of network traffic data. Specifically, the system 100 can be an environment in which a client device requests for visual playback of network traffic data from a prior period in time from a playback server 110. The playback server 110 can monitor network traffic data of various network traffic devices and store data indicative of the monitored network traffic data based on a delta-encoding scheme. When the client device requests for visual playback of the network traffic data, the server can acquire the stored data and execute a forward reverse delta encoding process to generate the network traffic playback data in a streamlined format. The streamlined format enables a user of the client device to view the network traffic playback data and traverse forward in time and backward in time through the data. The client device can display network traffic playback data or the playback server can display the network traffic playback for interaction by user 102. FIG. 1 illustrates various operations that can be performed in the sequence indicated as described below, in another sequence, with additional processes, or fewer processes.

In some implementations, the system 100 can include a client device 104 and a playback server 110. The playback server 110 can include one or more computers connected locally or connected over a network. Additionally, the playback server 110 can include one or more data storage components to store network traffic data and other data components. For example, the data storage components can include one or more databases, the cloud, one or more solid-state drives, hard drive disks, and other storage components. The playback server 110 can communicate with client device 104 and other client devices over network 106. The network 106 can include, for example, a local network, such as Bluetooth, Wi-Fi, or a larger network, such as the Internet, to name a few examples. Alternatively, a user may directly interact with the playback server 110 by way of a touchscreen, a monitor, a keyboard, and a mouse, or some other form of interaction with the playback server 110.

The client device 104 can include, for example, a mobile device, a personal computer, a handheld device, a portable device, a tablet, an embedded microprocessor device, and other devices. The client device 104 can also include a server, multiple servers, and other devices that act as stand-alone devices and can communicate with the playback server 110 over the network 106. In some examples, the client device 104 may communicate with the playback server 110 through a different client device.

The playback server 110 can communicate with the client device 104 over the network 106 for various purposes. Specifically, a user 102 associated with the client device 104 may request for visual playback of network traffic data from a prior time period. The user 102 can provide details of the request to the client device 104 and the client device 104 can formulate a request to provide to the playback server 110. In response, the playback server 110 can aggregate the stored data, execute the stored data through the forced reverse delta encoding process, and provide results to the client device 104 in the form of a data ticker for interactive visual playback. Similarly, the playback server 110 can provide updates to the data ticker of the client device 104 as more network traffic data is acquired from various network devices. This process will be further described below.

In some implementations, the playback server 110 may also communicate with various databases. The various databases can store information for identification and tracking of client device 104, as well as other client devices, as well as for tracking network traffic data associated with various network devices. The various network devices can include, for example, an access point, a router, a hub, a bridge, a gateway, a switch, and a modem, to name some examples. The various network devices can also include different satellites and their orbits, which can also be visualized for playback. Additionally, data associated with other network devices can include third party business partners, public utilities, various customers, and crowd-sourced information gathering. The playback server 110 can monitor the network activity associated with each of the network devices. The playback server 110 can acquire network activity as network traffic is transmitted between the various network devices. For example, the network devices can be spanned across various geographic regions and associated with different services. A network device associated with a residential property on the east coast, e.g., a router, may request for data from a server for streaming social media located on the west coast, for example. In this particular instance, the playback server 110 can monitor data traffic from each of the network devices in between the router on the east coast and the server on the west coast.

In some implementations, the playback server 110 can enable alarm status triggers. The alarm status triggers can be preconfigured in advance to automatically cause the playback server 110 to prepare data ticker(s) for playback. In this case, when a user request is subsequently received by the playback server 110 for playback data, the data ticker(s) prepared in advance can be provided to client device 104 of user 102 with minimal delay.

The network activity monitored by the playback server 110 can include traceroute activity, network latency, network speed, network bandwidth, and other network activity, to name a few examples. The playback server 110 can identify the network activity associated with each of the network devices at various time instances. For example, the playback server 110 can ping or send a request to each network device every minute or some other predetermined time period and store results of the network latency in one or more of the connected data storage components. However, the amount of network activity data that the playback server 110 can acquire from each of the network devices can be a large amount. In order to reduce the amount of storage required for the network activity and to improve the usage of the connected data storage components, the playback server 110 can store data indicative of the acquired network traffic associated with each network device based on a delta-encoding scheme. The delta-encoding scheme enables the playback server 110 to store exorbitantly large amounts of network traffic data, e.g. big data, in a manner that minimizes the amount of data to be stored.

Specifically, the playback server 110 can store state changes of network traffic data that satisfy a particular limit in the delta-encoding scheme. The state changes can include (i) a prior state value and (ii) a next state value, each of the values associated with a particular network device, a data type, and a corresponding timestamp when the playback server 110 measured the data. An implementer of system 100 can designate the particular limit or the playback server 110 can learn an optimized value for the limit over time. By storing state value differences using the delta-encoding scheme, the system 100 can reduce the memory footprint of the stored network traffic data, store more network traffic data than typically allowed, and reproduce prior activity of the network traffic upon request.

For example, the playback server 110 identify a network latency value associated with a router at a first time instance and a second later time instance. If the difference amount between the first time instance and the second later time instance does not change by the particular limit, then the playback server 110 does not store the value associated with the second later time instance. The playback server 110 can acquire network latency values for a router to be 250 ms, 251 ms, 249 ms, and 249 ms, at four subsequent time instances. Moreover, the playback server 110 can include a particular limit of 3 ms. The playback server 110 can identify a difference of 1 ms between 250 ms and 251 ms, a difference of 2 ms between 251 ms and 249 ms, and a difference of 0 ms between 249 ms and 249 ms. As such, the playback server 110 can store a first time instance of 250 ms, and none of the values associated with the additional time instances because the delta between values at the subsequent time instance do not exceed the particular limit of 3 ms. On the other hand, if the second value were 254 ms instead of 251 ms, then the playback server 110 would store (i) 250 ms at the first time instance, (ii) 254 ms at the second time instance, and (iii) 249 ms at the third time instance. The data would be stored as follows, (i) 250 ms as the prior state and 254 ms as the next state and (ii) 254 ms as the prior state and 249 ms as the next state. The playback server 110 can generate state value pairs for each of traceroute activity, network latency, network speeds, and network bandwidth for each network device, to name a few examples. As such, the delta-encoding scheme enables a reduction in the overall memory storage of the network traffic activity.

In some implementations, the playback server 110 can store geographical data in the one or more connected databases. The geographical data can include, for example, weather data, lightning strikes, forest fires, earthquakes, tsunamis, and other inclement weather. The geographical data can also include satellite orbit data and power outage data, which can be mapped against the network data. The playback server 110 can associate the geographical data with the various network devices. For example, if the playback server 110 is monitoring one hundred routers in a particular area of New York City, the playback server 110 can also acquire geographical data at a similar time in New York City as the network traffic data is being monitored and acquired. The geographical data can be acquired from various weather services, weather databases, and other external weather components. The playback server 110 can acquire the weather data for aiding an individual analyzing the network data to understand a context or a cause of the network activity. Specifically, when the network activity is provided back to a client device for visual playback, the weather data can additionally be provided to the client device for understanding of causes leading up to network issues or outages.

System 100 is useful in scenarios involving network operations, network debugging, network management, and other monitoring purposes. For example, states of network devices can be of critical importance to orient operations and engineering staff seeking to understand an issue with a network. This is because engineering staff may notice an issue with a network without identifying causes leading up to the network issue. For example, an engineering company monitoring a network may view the network and notice a broken connection between two network devices. However, it is not readily apparent what events took place that led to the broken connection. As such, an engineer or an operations staff can communicate with the playback server 110 to retrieve visual playback information from a time period prior to the network outage to view how the network devices were operating before the network outage occurred.

System 100 illustrates an example of an individual seeking to view prior network activity leading up to a network outage. For example, a user 102 may view a user interface 105 on their client device 104. The user interface 105 can include a map of one or more geographical regions of an area. The geographical regions can include one or more network devices or nodes that communicate with one another. For example, the user interface 105 can include nodes 1 through N located at various portions of the United States. Node 2 communicates with node 1 and node N; node 1 communicates with node 2, node N, and node 3. Similarly, node 3 communicates with node 1 and node N. However, the user 102 can determine from the user interface that the connection between node N and node 2 is broken. Although this information offers the problem, the cause for the broken connection between node 2 and node N may not be apparent to user 102.

In some implementations, the user 102 can instruct the client device 104 to submit a request 108 to the playback server 110 for visual playback. The request can include various components that aid the playback server 110 in acquiring network activity data for providing to the client device 104 for visual playback. Specifically, the request 108 can include a time range prior to the current time range. For example, the user interface 105 illustrates a state of the network on Jan. 2, 2022. The user 102 can request for a time period prior to the date of Jan. 2, 2022. This can include a time range of a first time and a subsequent second time, both prior to Jan. 2, 2022. For example, the time range can cover any predetermined time range prior to Jan. 2, 2022, such as one hour on Jan. 1, 2022, a 24 hour time period on Dec. 31, 2022, a week's work from Dec. 24, 2021 to Dec. 31, 2021, a six month period, a year period, or another time range.

The request 108 can also include a locational identifier. The locational identifier can include a latitude and longitude, a city, such as New York City, a geographic region, and/or a particular state. The locational identifier can be defined with a latitude and longitude point as well as a radius extending outwards from the point. For example, the latitude can include 41°53'24"N and the longitude can include 12°29'32"E, within a 5-mile radius.

Additionally, the request 108 can include data identifying one or more of the network devices to be monitored. For example, the user 102 can provide data identifying the network devices of node 1, node 2, node 3, and node N, shown in the user interface 105. The data identifying the network devices can include, for example, an IP address, a MAC address, a device name, and other device identifiers known to the playback server 110. In some implementations, the user 102 can specify a set of devices within the locational identifier. For example, the user 102 can specify IP addresses of node 1 and node 2 in a particular region. In some implementations, the user 102 can specify a set of devices within multiple locational identifiers. For example, the user 102 can specify IP addresses of node 1 and node 2 in a particular region and node 3 and node N in another geographic region.

In response to defining the parameters of the request 108, the client device 104 can transmit data identifying the request 108 to the playback server 110 over the network 106. In some implementations, the client device 104 can transmit the request 108 for visual playback to one of the externally connected databases and provide the stored location of the request to the playback server 110. In some implementations, the client device 104 can transmit the request 108 for visual playback to the playback server 110. In response to receiving the request 108, the playback server 110 can provide a confirmation to the client device 104 indicating it has received the request, e.g., an acknowledgement of the request 108, and is currently processing the request 108 to provide visual playback information in a timely manner. In some implementations, the playback server 110 can initiate processing the request 108 without providing an acknowledgement of the request 108.

In some implementations, the playback server 110 can analyze the components of the received request 108 (112). Specifically, the playback server 110 can extract a geographical location identifier from the request, identifiers of network devices from the request, and the time range from the request. In some implementations, the request 108 may include one or more of the components identified. The playback server 110 can extract the information from the request 108 and use the information to generate the visual playback information to provide to the client device 104.

In some implementations, the playback server 110 can obtain the network state data from the one or more connected databases (114). The network state data can include the network activity for each of the identified devices associated with the components extracted from the request 108. For example, the playback server 110 can query the one or more connected databases for all of the network state data of network devices identified by the request. The one or more connected databases may store the network state data indexed by network devices and time identifiers. For example, the one or more connected databases may include network state data, e.g., prior state values and next state values, first indexed by an identifier of the network device, such as "192.168.1.100" and secondly indexed by time, such as "09:01:00" and "09:02:00". The data that is indexed includes a prior state value and a next state value for a particular characteristic of the network device. This can include traceroute activity, network latency, network speed, network bandwidth, and other network activity. However, in some cases, the one or more connected databases may not include data for both a prior state and a next state of a network device. As such, the server 110 needs to build the network playback data such that the data is configured in a streamlined fashion to enable a multi-directionality movement, as will be further described below.

In some implementations, the playback server 110 can obtain the data from the one or more connected databases based on the data identified in the request 108 and execute a forward reversed delta encoding process (116). Specifically, the playback server 110 executes the forward reversed delta encoding process to create a representation of the data that can be processed efficiently and viewed with respect to time. In this manner, a user, e.g., user 102, can view the network data and interact with the network data by moving forward through time and backward through time to view how the network data changes with respect to time.

With the forward reversed delta encoding process, the playback server 110 seeks to create a data stream that has contiguous components. Specifically, the playback server 110 seeks to connect the various network state values for each network device. For example, the playback server 110 seeks to connect in a linear fashion a prior state to a next state of a first time instance to a subsequent next prior state and a subsequent next state of a subsequent next time instance, e.g., prior state->next state->prior state->next state. In this manner, the prior states are linked together with the next states to enable forward and reverse visual network playback of the state values. The playback server 110 can connect the network state values in a variety of object-oriented functions. The functions can include, for example, a linked list, a class, a library, a struct, an object, characters, arrays, and other data types.

In order to create this data stream, the playback server 110 initially sorts network data associated with each network device by a time-based characteristic. The time-based characteristic can be based on the timestamp, for example. Additionally and/or alternatively, the characteristic can include location, network latency amount, network speed, or another characteristic. For example, the playback server 110 can sort or rank the nodes or network activity associated with each network device based on timestamp. The playback server 110 can initially rank or sort the nodes by timestamp for creating the data stream. In response to ranking the node by timestamp, or a first characteristic, the playback server 110 can analyze whether each network data for each network device includes a prior state value. By ensuring that each network data for each network device includes a prior state value, the playback server 110 can ensure that the user 102 can move backwards and forwards in time when viewing network activity. If the playback server 110 determines that each network data for each network device includes a prior state value, then the playback server 110 can exit out of the forced reversed delta encoding process and proceed to provide the ranked data to a data ticker, which will be further described below.

However, if the playback server 110 determines that one or more network data does not include a prior state value, then the playback server 110 can perform a search throughout the one or more connected databases for each of the missing prior state values for the associated network devices. If the playback server 110 identifies one or more missing prior state values for state transitional data associated with a network device that match to similar identified network devices from a prior date and time, then the playback server 110 can combine the missing prior state values with the corresponding state transitional data that are missing prior state values for a respective network device. The playback server 110 can iterate through this process until all of the prior state values have been identified and combined with the missing network data values. However, if the playback server 110 does not identify the prior state values from the one or more connected databases, then the playback server 110 performs an additional process on each network data that is (i) missing the prior state value and (ii) a prior state value was not found from the search. Specifically, the playback server 110 copies the next state value to a prior state value for state transitional data that misses the prior state value and only includes one state value. In this case, the state transitional data will include a prior state value and a next state value as the same data components. Once the playback server 110 has either found a prior state value or copied the next state value to the missing prior state value, the playback server 110 is ready to provide the network visual playback data to the client device 104.

In some implementations, the playback server 110 can analyze the results generated by the forced reversed delta encoding process (118). Specifically, the playback server 110 can compare the results to the time range extracted from the provided request 108. For example, the playback server 110 can compare the timestamps in the data stream generated by the forced reversed delta encoding process to the time range identified in the request 108. If any of the timestamps fall outside of the time range extracted from the request, then the playback server 110 discard those specific network data features from the data stream. Alternatively, the network data features from the data stream that are within the time range identified in the request 108 are added to a data ticker.

In some implementations, the playback server 110 can provide the network data features that are within the time range identified in the request 108 to a data ticker (120). The data ticker can be a software module that includes one or more software components for displaying network playback data. The data ticker also includes functionality that enables a user to interact with the network playback data. Specifically, the data ticker enables a user to control the movement of the network playback data, e.g., forward or backward, as well as the speed at which the playback data moves forward and backward. For example, the data ticker enables the user 102 to move at 0.5× normal speed, 1× normal speed, 2× normal speed, and greater. Additionally, the data ticker enables the user to pause, fast forward, and rewind the network playback data.

In some implementations, the data ticker displays imagery of the network playback data by reading the prior state value and the next state value of one or more corresponding network devices. The data ticker can display images and or videos illustrative of the prior state and next state values. Similarly, the data ticker can display images or videos based on the user 102's selection of moving forward or backward through the state values of the data stream. The data ticker can either move forward in time by incrementing a pointer that is currently set to the state being displayed. In response, the data ticker can move forward from a prior state value to a next state value and a next state value to a subsequent prior state value. Similarly, the data ticker can move in reverse from a prior state value to a previous next state value, and the previous next state value to the previous prior state value. In this manner, the user 102 can view how the network activity changes between each state change.

Additionally, because the playback server 110 stores states based on the delta between subsequent states satisfying a particular limit, the user 102 viewing the network playback visualization data views state changes more effectively. For example, the user 102 can view network data that changes in a significant manner to identify context associated with their network. In some cases, if a network state does not change for a period of time, then it may be beneficial for the user 102 to view that network data. Rather, by storing network data based on the delta-encoding scheme, the user 102 can view more meaningful network data that illustrates how various components of the network change over time.

In response to providing the data to the data ticker, the playback server 110 can provide the data 124 indicative of the data ticker to the client device 104 over the network. As illustrated in system 100, the data 124 can illustrate various network data components over a prior period of time identified by the request. For example, the data 124 in the data ticker can illustrate network playback data from Jul. 1, 2021 to Jan. 1, 2022 of network data over nodes 1 through N in similar geographic regions to the network devices and geographic regions illustrated in the user interface 105. Specifically, the user 102 can view the user interface 125-1 to view a state of the nodes 1-N on Jul. 1, 2021. Similarly, the user 102 can fast forward the data ticker from the user interface 125-1 on Jul. 1, 2021 to another user interface to view a state of the nodes on Jan. 1, 2022, as shown in user interface 125-N. Moreover, the user 102 can rewind the data ticker from the user interface 125-N on Jan. 1, 2022 to another user interface between Jul. 1, 2021 and Jan. 1, 2022 to view a state of the nodes on a particular day and time.

As illustrated on the user interface 125-1, communication broke between node 1 and node 2, node 2 and node N, and node 3 and node N. The user 102 can interact with the fast forward button on their client device 104 to view the state of the nodes on a date leading up to the Jan. 2, 2022 date illustrated by the user interface 105. As the user 102 may notice the state of the network on Jan. 1, 2022 appears to be similar to the state of the network on Jan. 2, 2022 due to the broke connection between nodes 2 and N, the user 102 may rewind the data ticker to an earlier date to try to identify any network activity that caused the broken connection between nodes 2 and N.

Similarly, the data ticker may display a particular type of weather on the user interface of the client device 104. The weather may aid the user 102 in understanding why the network connection broke between node 2 and node N. For example, if the network connection between node 2 and node N appeared normal on Dec. 26, 2021, a snow storm appeared in the region covering node N on Dec. 27, 2021, and the network connection between node N and 2 broke on Dec. 27, 2021, the user 102 may be able to attribute the broken network connection due to the snow storm. However, the user 102 may question why the network connection between node N to node 1 and node N to node 3 did not also break if the network connection from node N to node 2 went down due to the snowstorm. As such, the user 102 may further isolate the incident by notifying that a router or gateway that specifically connects node N to Node 2 is the underlying cause for the broken connection. Other examples based on the user 102's analyses of the data ticker are also possible based on the functions and processes with respect to system 100.

Figure 2A:
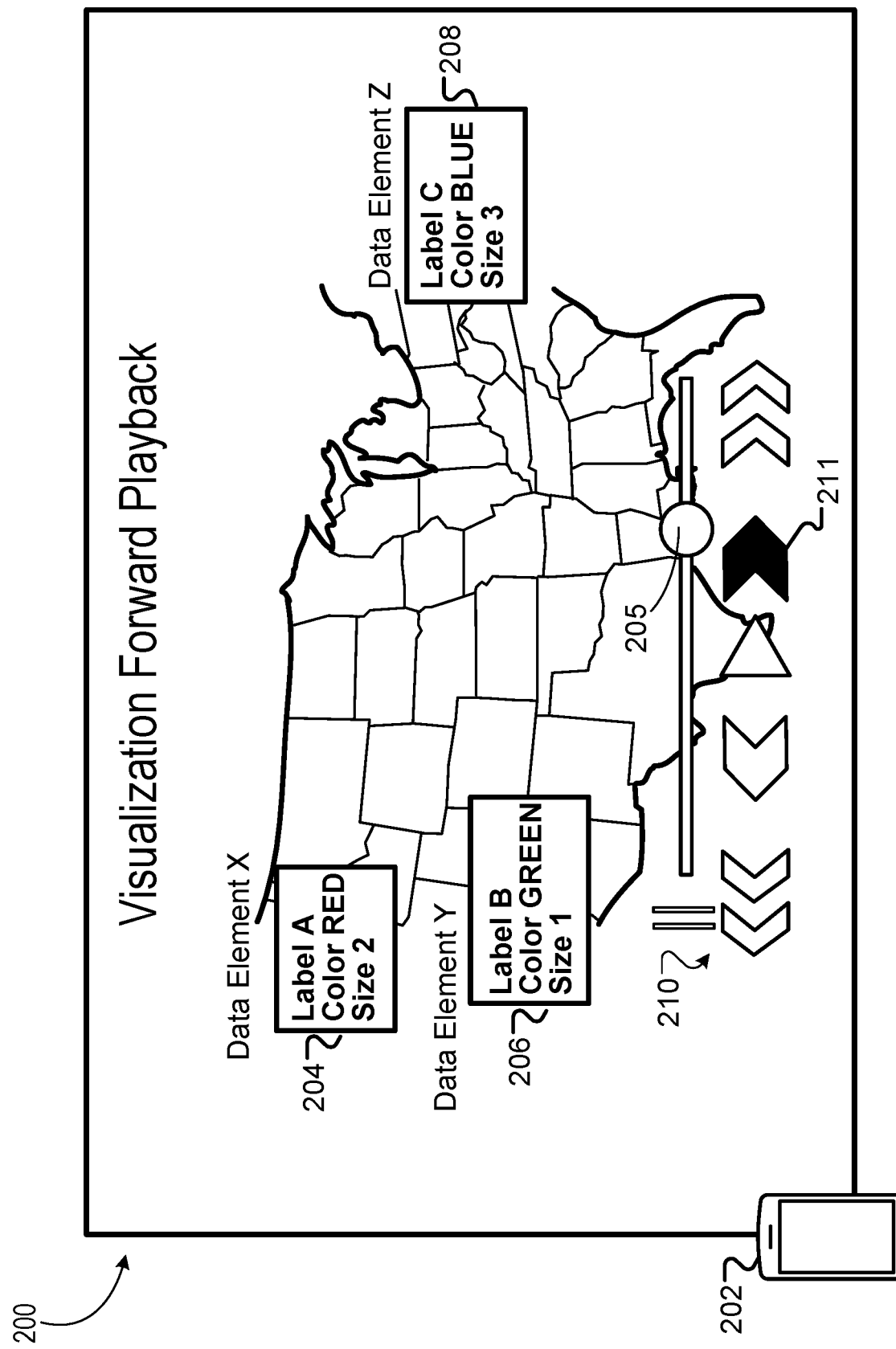
FIGS. 2A-2B are user interfaces on a client device that illustrates examples of forward visualization playback and reverse visualization playback.

FIG. 2A is a user interface 200 on a client device 202 that illustrates an example of forward visualization playback and reverse visualization playback. Specifically, the user interface 200 illustrates the data ticker of the client device 202 displaying the network states of various network devices on a map of geographic regions. For example, the map can include a data element X 204, a data element Y 206, and a data element Z 208. The different data elements can be digital representations of various states of network devices in various geographical regions. The network devices can include, for example, a router, a gateway, a switch, or any of the previously aforementioned network devices. The user interface 200 also illustrates a scroll bar 210 for interacting with a time that corresponds to various network activity of the network devices.

In some implementations, the locations of the various data elements 204, 206, and 208 on the map can be representative of their locations in real life. For example, data element 204 can be physically located in the upper west coast region of the United States; data element 206 can be physically located in the lower west coast region of the United States; and, data element 208 can be physically located in the Middle East coast region of the United States.

To distinguish the data elements from another, the data ticker can associate different characteristics with each data element for display on client device 202. For example, data element X can be digitally represented with a label "A," colored red, and have an icon size of 2. Data element Y can be digitally represented with a label "B," colored green, and have an icon size of 1. Data element Z can be digitally represented with a label "C," colored blue, and have an icon size of 3. The colors and size of each element can represent a particular feature of that data element. For example, the larger the size of the element, the more of an issue associated with that data element. In another example, any data element that is colored red indicates an issue with that respective physical element.

In some implementations, the user can interact with the user interface 200 to view different states of the data elements 204, 206, and 208. The user can interact with the button 211 on the scroll bar 210 to fast-forward the data ticker to a new date, resulting in new data elements being displayed. For example, the user can press the button 211 with his finger, speak to the client device 202 indicating to fast forward the data ticker, or type on a keyboard of the client device 202, e.g., digitally or mechanically, to fast forward the data ticker. In response to fast forwarding the data ticker, the network data attributes associated with the data elements 204, 206, and 208 can change their values based on a respective time instance. This change in value gives the user a view as to how the network between data elements 204, 206, and 208 change over time and with respect to time. The scroll bar also includes the pause button, a skip to the reverse end button, a rewind button, a play button, the button 211 for fast forward, and a skip to the forward end button. Additionally, the scroll bar may give the user flexibility to set a scrolling speed, e.g., 0.75×, 1×, 2×, etc., as well as move a scrub control 205 to a desired location associated with the network data. The movement of the scrub control 205 to a desired location also correspondingly moves a pointer set by the data ticker in memory, as will be further illustrated and described below.

Figure 2B:
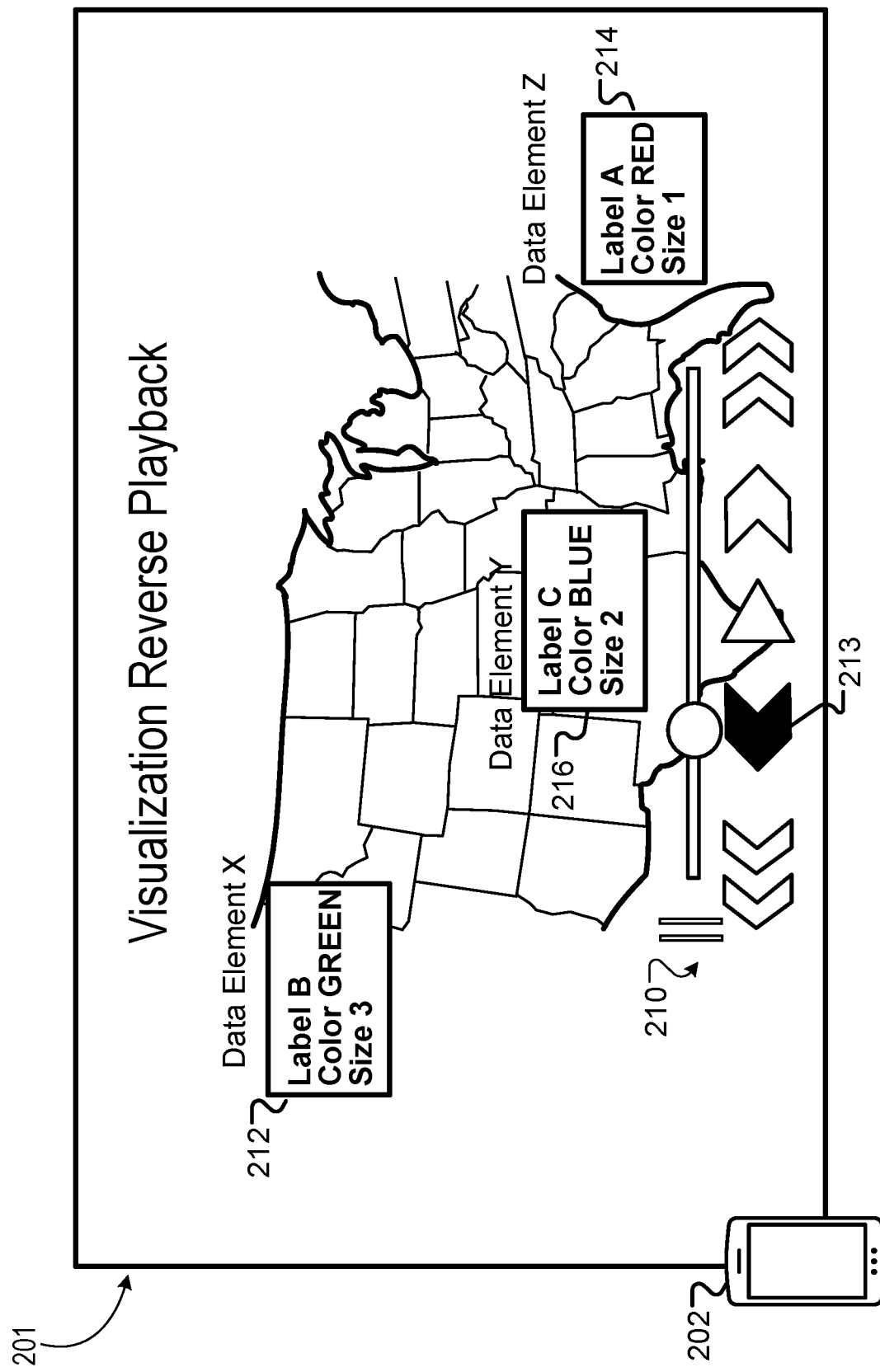

FIG. 2B is another user interface 201 on a client device 202 that illustrates an example of forward visualization playback and reverse visualization playback. User interface 201 has similar components and performs similar functions of the user interface 200 of FIG. 2A. For example, user interface 201 displayed by the data ticker of client device 202 illustrates three different data elements 212, 214, and 216. The data elements 212, 214, and 216 can be digital representations of various states of network devices at different geographic regions in the United States. Additionally, each data elements 212, 214, and 216 can be defined by one or more characteristics to differentiate from one another. The characteristics can include, for example, a label, a color, and a size, to name a few examples.

Similarly, the user can interact with one or more buttons on the scroll bar 210. Here, the user can interact with the rewind button 213 to rewind the data ticker to a new date. In response to rewinding the data ticker to a new date, the network data attributes associated with the data elements 212, 214, and 216 can change their values based on a respective time instance. This change in values gives the user a view as to how the network between data elements 212, 214, and 216 change over time and with respect to time.

Figure 3A:
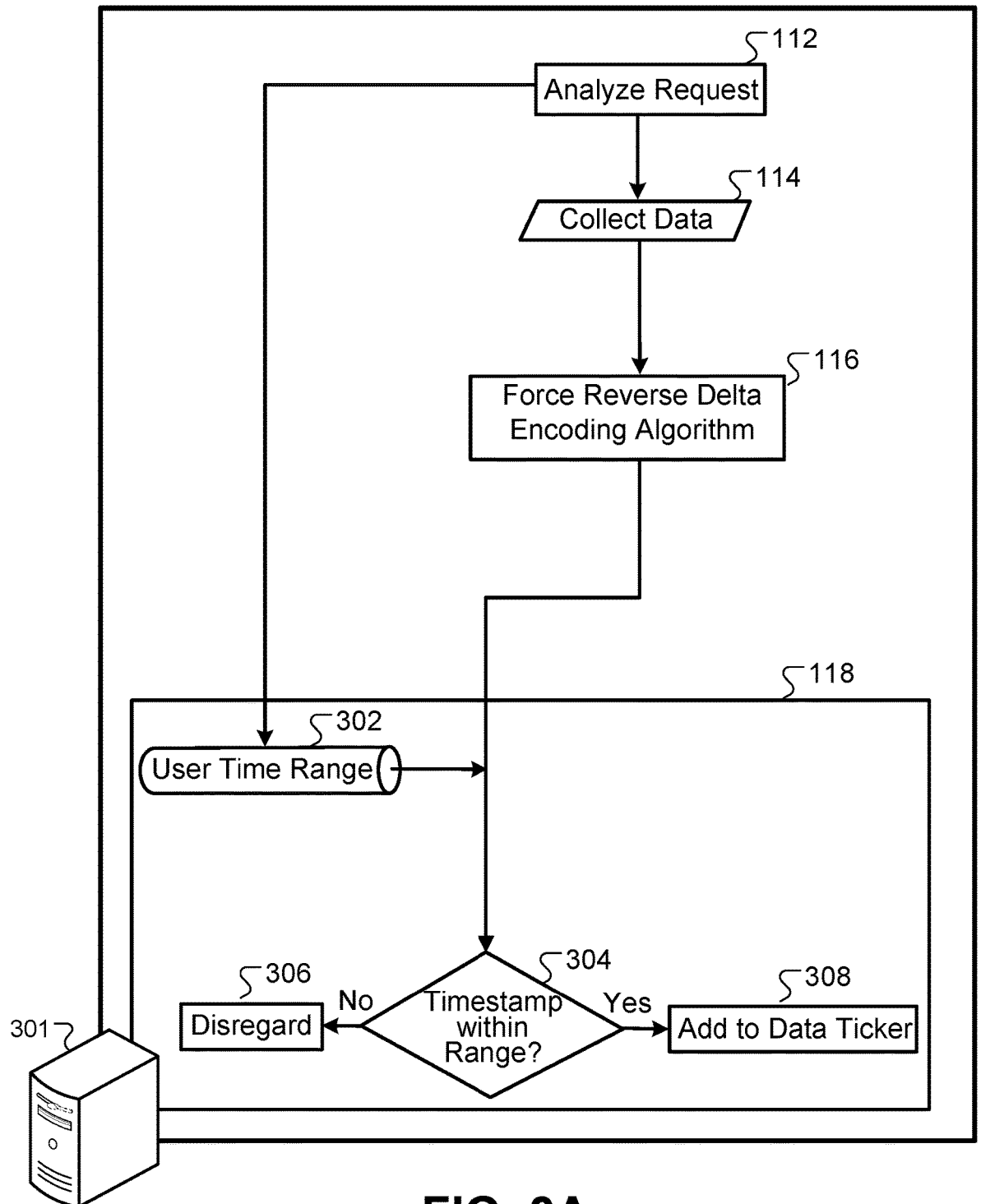
FIGS. 3A-3B are flow diagrams that illustrate examples of processes for generating the visual playback of network traffic data using a forward reverse delta encoding.

FIG. 3A is a flow diagram that illustrates an example of a process for generating the visual playback of network traffic data using a forward reverse delta encoding. The playback server 301 can perform the process shown in FIG. 3A. The playback server 301 is similar to the playback server 110. As such, the playback server 301 can perform functions similar to the functions described with respect to system 100.

During (112), the playback server 301 can receive a request from a client device for network visual playback data. The playback server 301 can extract and identify components of the request. The process 112 is similar to the process 112 described with respect to system 100.

During (114), the playback server 301 can obtain the network state data from the one or more connected databases. The playback server 301 obtains the network state data to build the network visualization playback data. For example, the playback server 301 can obtain the network state data by operating on bulk, unsorted, big data accessed from the one or more connected databases. The process 114 is similar to the process 114 described with respect to system 100.

During (116), the playback server 301 can obtain the data from the one or more connected databases based on the data identified in the request and execute a forward reversed delta encoding process. The playback server 301 executes the forward reversed delta encoding process to create a representation of the data that can be processed and viewed with respect to time. Moreover, a user can view the resultant data of the forward reversed delta encoding process and move forward and backward through time to view how network values change with specific network devices. The process 116 is similar to the process 116 described with respect to system 100.

In some implementations, after the playback server 301 receives the first request, any subsequent request would be an automatous action that continually performs functions related to 112, 114, and 116. Specifically, the processes related to 112, 114, and 116 can be performed in an ongoing and automated fashion in advance for a user's future use. As such, an ongoing user request or alarm state can trigger the process 118 described below.

During (118), the playback server 301 can analyze the results generated by the forced reversed delta encoding process. Specifically, the playback server 301 can compare the results to the user time range 302 extracted from the request. The playback server 301 can extract the components of the request, e.g., the location identifier, network device(s) identifier(s), and a user time range 302, and filter the results of the forced reversed delta encoding process based on the user time range 302. The process 118 is similar to the process 118 describes with respect to system 100.

For instance, at 304, the playback server 301 can compare each timestamp in the data stream output by the forced reversed delta encoding process to the user time range 302. The playback server 301 performs this iterative process by determining whether each timestamp in the data stream falls within the user time range 304. If a timestamp does not fall within the user time range 302, then at 306, the playback server 301 can discard a corresponding prior state and next state associated with that timestamp. Alternatively, in a time does fall within the user time range 302, then at 308, the playback server 301 can add the corresponding prior state and the next state associated with that timestamp to a data ticker. The data ticker is then used for displaying the network state values that fall within the user time range 302.

Figure 3B:
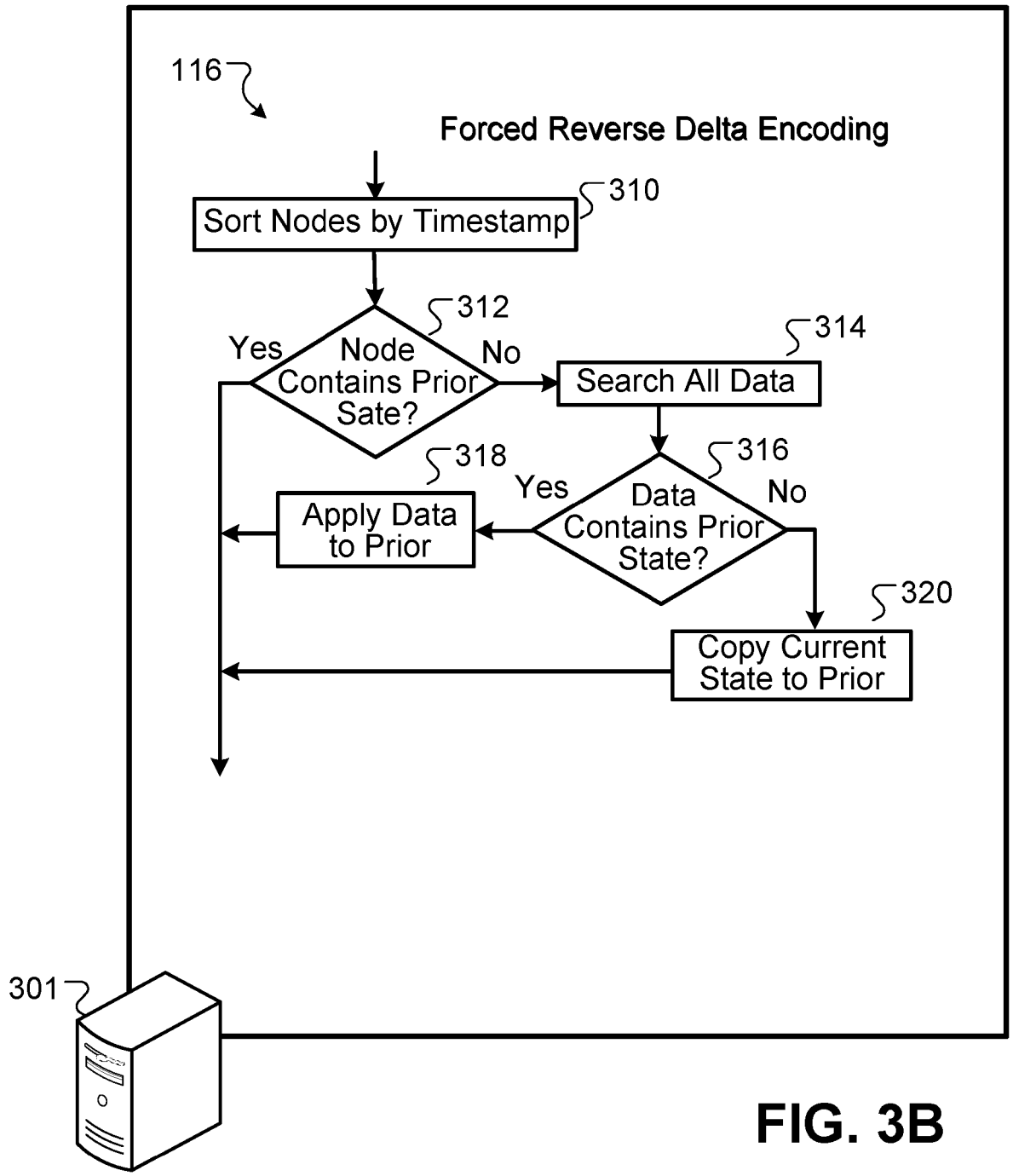

FIG. 3B is another flow diagram that illustrates an example of a process 116 for generating the visual playback of network traffic data using a forward reverse delta encoding. The playback server 301 performs the forward reverse delta encoding as shown in process 116. The process 116 is similar to the process 116 described with respect to system 100.

During 310, the playback server 301 initiates the forced reverse delta-encoding process by sorting each network data associated with each network device by a characteristic. The characteristic can include day and timestamp and can include, for example, location, network latency amount, network speed, or another characteristic. For example, the playback server 301 can sort or rank the network activity based on their respective timestamp. The ranking can be in ascending or descending order.

In response to ranking the network activity data, the playback server 301 can determine or analyze whether each network device includes a prior state value (312). The playback server 301 seeks to ensure that each network data includes a prior state value because the prior state values connects to even further prior state values, which ultimately enables the user to travel in backwards fashion when traversing through the data on the data ticker. For example, the playback server 301 can analyze the bulk of sorted data, and specifically, each piece of network data to check for a prior state value. If the playback server 301 determines that each network data does include a prior state value, the playback server 310 can exit out of the forced reversed delta encoding process and proceed to provide the ranked data to a data ticker for displaying the network playback data.

Alternatively, if the playback server 301 determines that one or more network data from the ranked data does not include a prior state value, then at 314, the playback server 301 can perform a search throughout the one or more connected databases for each of the missing prior state values for the associated network devices. Specifically, the playback server 301 can execute on-demand searching for individual data element requests. At 316, if the playback server 301 identifies one or more missing prior state values for a network device that match to similarly identified timestamps, then at 318, the playback server 301 can combine the missing network data with the identified prior state values. The playback server 301 can iterate through this process until all of the prior state values have been identified and combined with the missing network data values. Alternatively, if the playback server 301 does not identify the prior state values from the one or more connected databases, then the playback server 301 performs an additional process on each network data that is (i) missing the prior state value and (ii) a prior state value was not found from the search during 314. Specifically, at 320, the playback server 301 copies the next state value to a prior state value for network data that misses the prior state value and only includes one state value. In this case, the network data will include a prior state value and a next state value as the same data components. After the playback server 301 performs the forced reverse delta encoding, the output results are provided to 118 from FIG. 3A.

Figure 4:
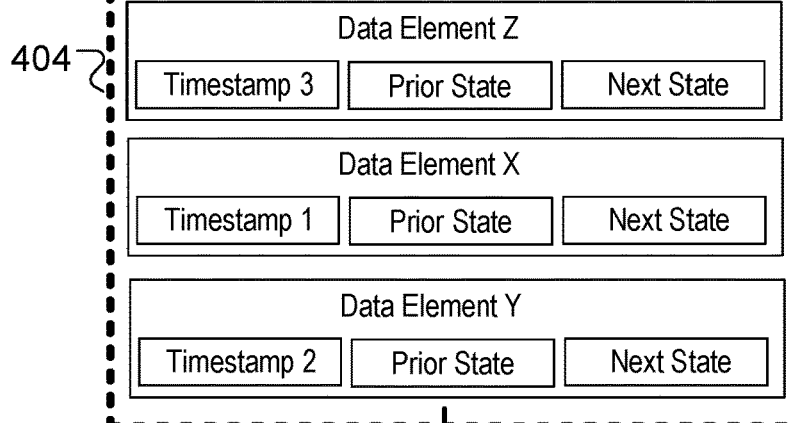
FIG. 4 is a block diagram that illustrates an example of unsorted and sorted network traffic data.
Figure 4:
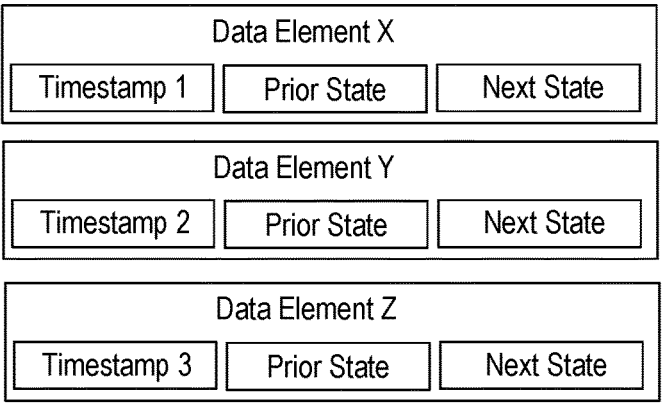
Figure 4:
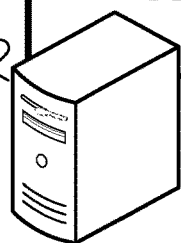

FIG. 4 is a block diagram 400 that illustrates an example of unsorted and sorted network traffic data. Specifically, the block diagram 400 illustrates a set 404 of pre-sorted, non-chronological nodes or data elements and a set 406 of post-sorted, chronological nodes or data elements after being processed by the playback server 402 using the process of forced reverse delta encoding 405. The playback server 402 is similar to playback servers 110 and 301. Similarly, the process of forced reverse delta encoding 405 is a similar process performed in 116 in system 100 and shown in FIG. 3B.

The set 404 of pre-sorted, non-chronological nodes can include a set of nodes or data elements X, Y, and Z. The data elements X, Y, and Z can represent three network devices, e.g., a router, a switch, a gateway, or another network device. Each data element can include a timestamp with a prior state value and a next state value. For example, the set 404 includes a data element Z with a timestamp 3, a prior state value, and a next state value. This can correspond to a router, at a timestamp of 09:09:01, a prior state value of 40 MB/s for network speed, and a next state value of 60 MB/s. In another example, the set 404 includes a data element X with a timestamp 1, a prior state value, and a next state value.

Lastly, the set 404 includes a data element Y with a timestamp 2, a prior state value, and a next state value. The set 404's elements are out of order based on the placement of the network data from timestamp 3, to timestamp 1, and to timestamp 2. In these examples, the timestamp can refer to the next state value, and the next state value includes a paired prior state value.

In some implementations, the playback server 402 can provide the set 404 as input to the process of forced reverse delta encoding 405. The process of forced reverse delta encoding 405 can be performed as described with respect to 116 in FIG. 1 and FIG. 3B. The output of the forced reverse delta encoding 405 can include the set 406. The set 406 can include the nodes from set 404 rearranged in the correct sorted order. For example, the order includes element X with timestamp 1, element Y with timestamp 2, and element Z with timestamp 3.

Figure 5:
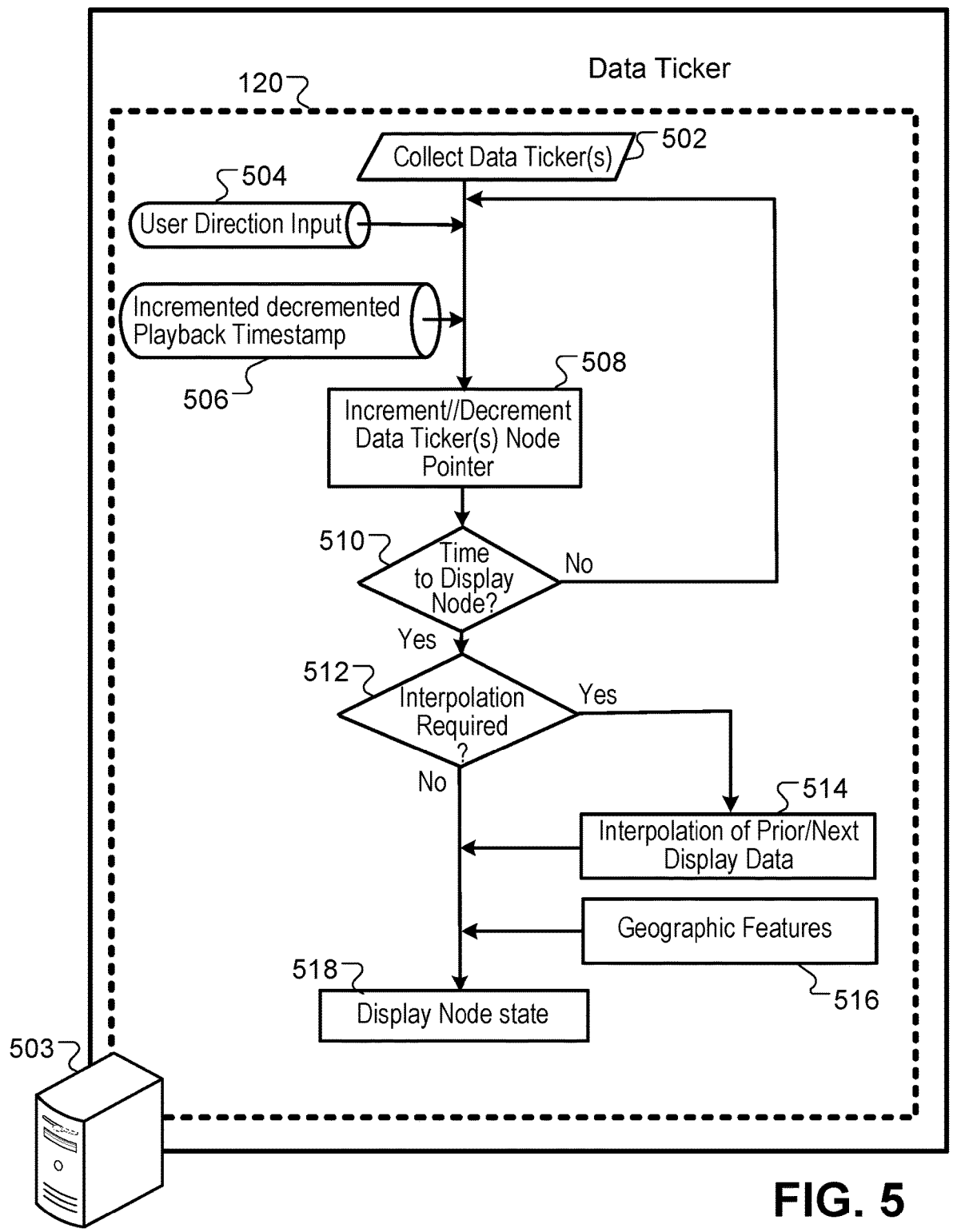
FIG. 5 is a flow diagram that illustrates an example of a process for displaying visual playback of network traffic data on a client device.

FIG. 5 is a flow diagram that illustrates an example of a process for displaying visual playback of network traffic data on a client device. In some implementations, the process of FIG. 5 can be performed and displayed on a monitor at a server. The server can be the playback server 503. The playback server 503 is similar to the playback servers 110, 301, and 402. Moreover, the process performed in FIG. 5 can include the process of displaying the visual playback through a data ticker. This process illustrated in 120 is similar to the data ticker playback 120 of FIG. 1.

In some implementations, the playback server 503 can collect a data ticker to display the virtual network playback data (502). The playback server 503 can present a software module on a on a connected display screen. In some implementations, the playback server 503 can transmit the software module of the data ticker to a client device for displaying the virtual network playback data. In some implementations, the playback server 503 may transmit the virtual network playback data to a client device. The client device may have pre-installed the data ticker, and the data ticker can display virtual network playback data received by the client device from the playback server 503.

The data ticker includes functionality to display the virtual network playback data and enables a user to interact with the virtual network playback data. Specifically, the user can interact with the data ticker by controlling the playback of the virtual network playback data (504). For example, the user can initiate the playing of the virtual network playback data, fast-forward the virtual network playback data as the data is played, rewind the virtual network playback data, and set a speed for each of fast forwarding, rewinding, and playing the virtual network playback data. For example, the speed for fast forwarding, rewinding, and playing can be 0.5× the normal speed, 1× the normal playback speed, 2× the normal playback speed, or another user-defined speed. The user can provide direction for instructing movement by tapping his finger on the display, speaking to the display, interacting with a keyboard and mouse connected to the display, or some other form of interaction.

Based on the instructions provided by the user to the data ticker, the data ticker initiates playback of the virtual network playback data by incrementing or decrementing a pointer through the virtual network playback data (506). First, the data ticker includes a playback timestamp. The playback timestamp is a time associated with the display of the data ticker. The playback timestamp is separate from the time stamps set by the virtual network playback data. However, the data ticker relies on the playback timestamp to determine when to display certain data elements or nodes from the virtual network playback data. For example, the playback timestamp can be initially set to "09H:01M:03S" and elapse in time or count in time similar to a clock.

The data ticker can increment or decrement a pointer that points to each data element or node of the virtual network playback data (508). The data element or node of the virtual network playback data can include a timestamp, with an associated prior state and next state. The data ticker's pointer moves forward or backward to a new timestamp when the data ticker is instructed to increment or decrement the pointer, respectively.

In response to the data ticker incrementing or decrementing the pointer to a new timestamp, the data ticker determines whether it is time to display the node or data element (510). For example, the data ticker determines whether the time indicated by the pointer matches to the playback timestamp indicated by the data ticker. If the time indicated by the pointer, e.g., "09H:01M:03S," matches to the playback time, e.g., "09H:01M:03S," then the data ticker proceeds to display the prior state value and the next state value associated with the time indicated by the pointer. However, should the time indicated by the pointer not match, then the data ticker proceeds to wait for user input to determine how to proceed regarding the incrementing or decrementing of the pointer.

The data ticker determines whether interpolation is required in response to determining that the playback time matches to the time indicated by the pointer (512). In some implementations, the data ticker analyzes both the prior state value and the next state value associated with the time indicated by the pointer. The data ticker can determine if the prior state value and the next state value differ by a threshold amount, then the data ticker can proceed to perform an interpolation in (514). An interpolation is performed to ensure that a sharp difference between a prior state value and a next state value is not displayed. An implementer of this system can set a threshold value. In some implementations, the threshold value can be learned over time based on feedback received from the user.

For example, a network device may have abruptly changed its network speed from 300 MB/s to 5 MB/s, and the playback server 503 generated virtual network playback data for that network device. The virtual network playback data can include a timestamp of "09:02:01," includes a prior state value of 300 MB/s, and a next state value of 5 MB/s. The data ticker can read the timestamp, the prior state value, and the next state value based on a position of the pointer, and compares the prior state value and the next state value. The data ticker can compare the difference between the prior state value and the next state value to be 295 MB/s, e.g., 300 MB/s-5 MB/s. In response, the data ticker can compare the 295 MB/s to a threshold value of 50 MB/s. If the comparison indicates that the difference value meets or exceeds the threshold value, then the data ticker can perform interpolation. Alternatively, if the comparison indicates that the difference is less than the threshold value, then the data ticker does not perform the interpolation.

In some implementations, the data ticker can perform interpolation to reduce the sharp difference between the prior state value and the next state value. For example, the data ticker can interpolate by creating additional states that illustrate a gradual change between the prior state and the next state. The data ticker can create additional data sets that have prior state values and next state values that are less than the threshold. Specifically, the new data sets can include (i) "09:02:01", prior state value of 300 MB/s, next state value of 290 MB/s, (ii) "09:02:01", prior state value of 290 MB/s, next state value of 280 MB/s, (iii) "09:02:01", prior state value of 280 MB/s, next state value of 270 MB/s, and so on. The data sets are created to (i) have a difference of less than the threshold between the prior state value and the next state value and (ii) create contiguous data sets between the original prior state value, e.g., 300 MB/s, and the original next state value, e.g., 5 MB/s. The difference or delta between each state value in a data set can be any delta, so long as the delta is less than the threshold. Moreover, the next state value of a particular data set must be the same value as a prior state value of a subsequent data set, e.g., contiguous data sets.

In response to performing interpolation or not performing the interpolation, the data ticker can apply different geographical features to the data elements being displayed (516). The different geographical features can include weather, lightning strikes, forest fires, and earthquakes, to name a few examples. The geographical features can also include satellite orbit data and power outage data, which can be mapped against the network data. The data ticker can overlay the different geographical features during the display of the data element to aid the user's visual in potentially understanding a context of the network activity. The data ticker can identify geographical data from one or more connected databases based on a timestamp of the current data element being displayed. The data ticker can retrieve the geographical data from the one or more connected databases based on the timestamp and a location of the network device being displayed. For example, the geographical feature may indicate that a lightning storm was occurring at the particular location of the network device and at the time designated by the timestamp. A user reviewing the playback of the virtual network data can then potentially attribute a cause of a failed network device, for example, to the lightning storm. Other examples are also possible.

In some implementations, the data ticker can display the state of the data element or node on the mapped display. For instance, the data ticker can read the next state value and the prior state value, the next state value being associated with a respective timestamp. The data ticker can then display the next state value associated with the timestamp. Then, during the transitioning between states by moving through the network playback data, the data ticker can display the prior state value and the next state value associated with the timestamp. For example, the data ticker can display an animated transition from a prior state value to a next state value when playing from one minute to the next. In this example, 11:59 PM can correspond to a prior state and 12:00 AM can correspond to a next state value. The data ticker can display the visualization of each of the displayed numbers at 11:59 PM (prior state) and transition to the new displayed numbers at 12:00 AM (next state) within the 1-minute change. At the end of the 1-minute transition, the displayed numbers associated with the prior state instantly changes to the displayed numbers associated with the next state.

In some implementations, the data ticker can display the prior state value and the next state value at a respective timestamp on a displaying surface. The displaying surface can include, for example, a spreadsheet, a table, a geographic map, a network map, any other type of map, or any of the aforementioned surfaces overlaid on top of one another. For example, the displaying surface can include a network map overlaid on top of a geographic map. The data ticker can select one or more displaying surfaces to display based on an identified location of the network devices and how those network devices interconnect. For example, if two network devices are to be displayed and a first network device exists in Washington, DC and a second network device exists in San Diego, California, then the data ticker can display a map that illustrates both regions of Washington, DC and San Diego as well as regions in between to illustrate connections between the two network devices. In some implementations, the displaying surface can also illustrate geographic and network connections between international countries.

The data ticker can display the node or data element states over top of the displaying surface on a display of a client device or a connected display of playback server 503. FIGS. 2A and 2B illustrate example displays of node states or data element states on a display surface. Similarly, the data ticker can display also display a scroll bar that enables the reviewing user to provide input on movement, e.g., forward or backward, of the visual network display data, such as that provided in 504.

Thus, each time the user provides input to adjust the display of the virtual network display data, the data ticker can increment or decrement a pointer to the subsequent prior state value and the subsequent next state value of a respective timestamp. Each time the data ticker's pointer moves to a new state value, the data ticker reads new state values after determining the time to display matches the playback timestamp, determines whether interpolation is required, and displays the state values along with the geographic features. In some implementations, if the data ticker determined that interpolation is required from 514, then the data ticker displays the multiple generated data sets resulting from the interpolation during 518. For example, if the data ticker's interpolation resulted in 20 data sets created, then the data ticker displays 20 data sets during 518.

Figure 6A:
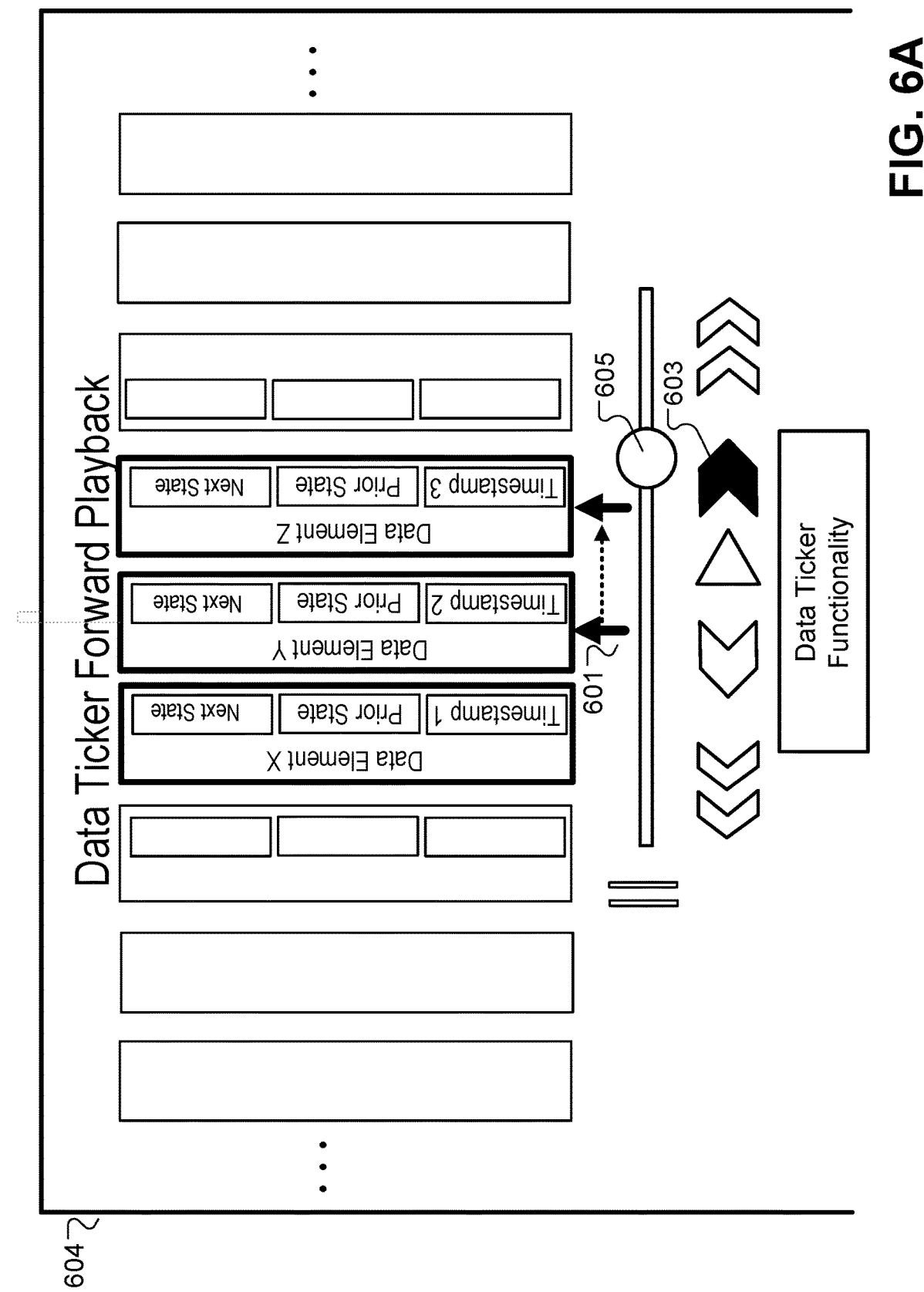

FIG. 6A is a block diagram 604 that illustrates an example of forward and reverse traversal through network traffic data during the display of the network traffic data. The data ticker functionality of block diagram 604 illustrates that when a user interacts with the scroll bar, the data ticker moves a position of the pointer. For example, when the user interacts with the fast forward button 603, the data ticker can move the pointer 601 forward in time from data element Y to data element Z in memory. The pointer 601 is not displayed to the user. The data element being pointed to by the pointer 601 can be displayed by the data ticker. Moreover, the circular scrub controller 605 illustrates a digital representation of the pointer 601 that is displayed to the user. The data ticker moves the circular scrub controller 605 which scrubs against or reads from the data and displays those data elements and their corresponding visualized states, as illustrated in FIGS. 2A-2B, for example.

FIG. 6B is another block diagram 606 that illustrates an example of forward and reverse traversal through network traffic data during the display of the network traffic data. The data ticker functionality of block diagram 606 illustrates that when a user interacts with the scroll bar, the data ticker moves a position of the pointer. For example, when the user interacts with the rewind button 609, the data ticker can move the pointer 607 backwards in time for data element Z to data element Y in memory. The pointer 607 is not displayed to the user. The data element being pointed to by the pointer 607 can be displayed by the data ticker. Moreover, the circular scrub controller 611 illustrates a digital representation of the pointer 607 that is displayed to the user. The data ticker moves the circular scrub controller 611 which scrubs against or reads from the data and displays those data elements and their corresponding visualized states, as illustrated in FIGS. 2A-2B, for example.

Figure 7:
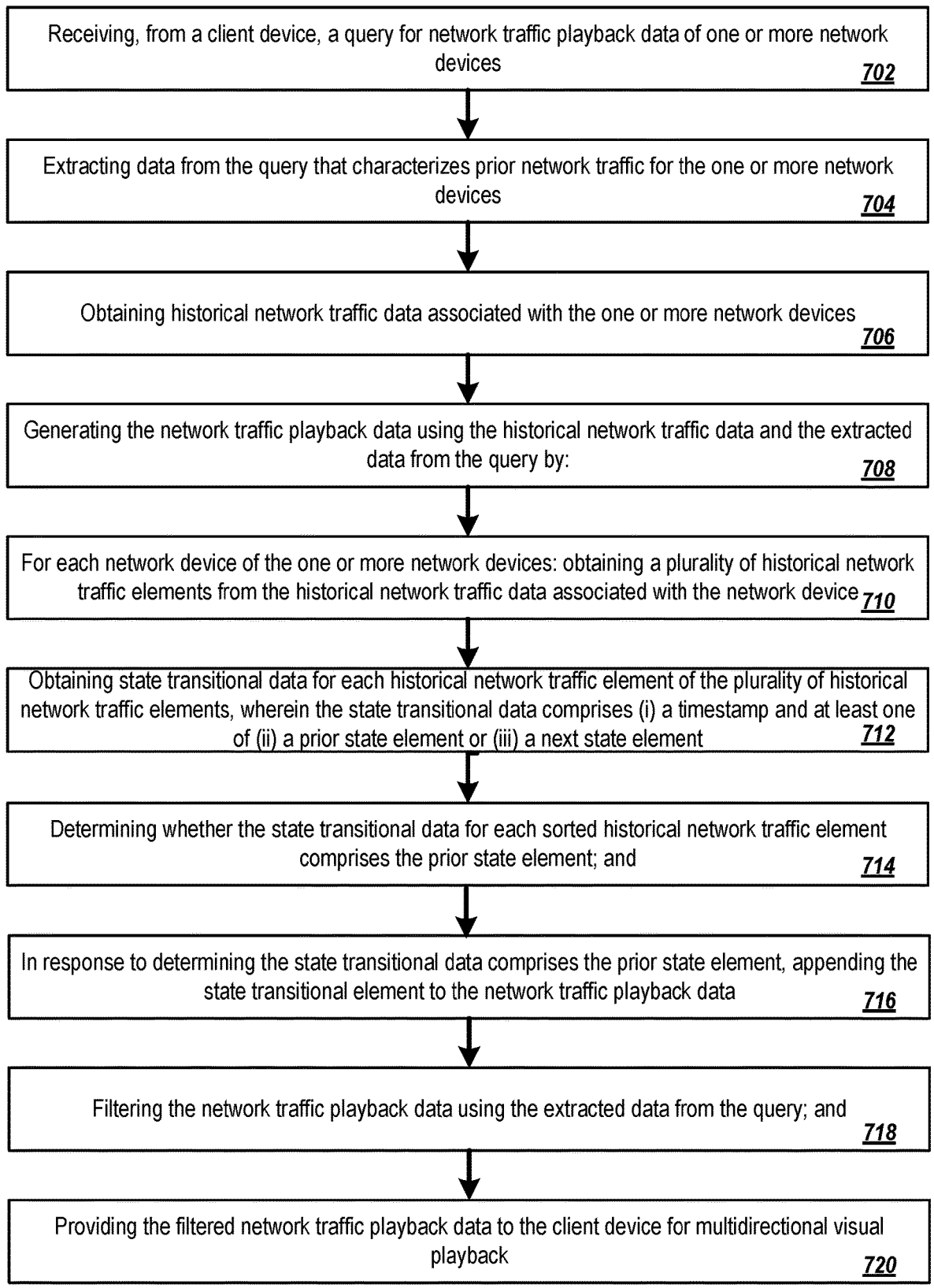
FIG. 7 is a flow diagram that illustrates an example of a process for providing visual playback of network traffic data.

FIG. 7 is a flow diagram that illustrates an example of a process 700 for providing visual playback of network traffic data. The playback servers 110, 301, 402, and 503 can perform the process 700.

In the process 700, the playback server can receive, from a client device, a query for network traffic playback data of one or more network devices (702). Specifically, a user of a client device can transmit a request to the playback server for visual playback. The request can include various components that aid the playback server in acquiring network activity data for providing to the client device for visual playback. Specifically, the request can include a time range prior to the current time range for data, a locational identifier associated with desired data, and data identifying one or more network devices to be monitored. The client device can transmit the request over a network to the playback server.

The playback server can extract data from the query that characterizes prior network traffic for the one or more network devices (704). In response to receiving the request, the playback server can extract and analyze the components of the received request. Specifically, the playback server can extract a geographical location identifier from the request, identifiers of network devices from the request, and the time range from the request, which can include a prior period to a current time and can include a predetermined length of time. This extracted information can be used to generate the visual playback information to provide to the client device.

The playback server can obtain historical network traffic data associated with the one or more network devices (706). Specifically, the playback server can obtain the network state data for each of the identified devices associated with the components extracted from the request. The data can be obtained from one or more connected databases. The one or more connected databases may store network state data indexed by network devices and time identifiers. For example, the one or more connected databases may include network state data, e.g., prior state values and next state values, first indexed by an identifier of the network device, such as "192.168.1.100" and secondly indexed by time, such as "09:01:00" and "09:02:00". The data that is indexed includes a prior state value and a next state value for a particular characteristic of the network device. This can include traceroute activity, network latency, network speed, network bandwidth, and other network activity. The playback server can obtain this data from the one or more connected databases, which can be retrieved in the form of bulk, unsorted, big data.

The playback server can generate the network traffic playback data using the historical network traffic data and the extracted data from the query (708). In response to obtaining the data from the one or more connected databases, the playback server can perform a forward reversed delta encoding process. The playback server executes the forward reversed delta encoding process to create a representation of the data that can be processed efficiently and viewed with respect to time. In this manner, a user can view the network data and interact with the network data by moving forward through time and backward through time to view how the network data changes with respect to time. With the forward reversed delta encoding process, the playback server seeks to create a data stream that has contiguous components. The contiguous components includes connecting various state values for each network device that can be connected in a linear fashion, e.g., prior state->next state->prior state->next state. In this manner, the prior states are linked together with the next states to enable forward and reverse visual network playback of the state values.

In order to create the stream, the playback server can initially sort the network data associated with each network device by a time-based characteristic. The time-based characteristic can be based on the timestamp, for example. Additionally and/or alternatively, the characteristic can include location, network latency amount, network speed, or another characteristic. In response to sorting or ranking the obtained network data, the playback server can execute processes (710)-(716) below to perform the forward reversed delta encoding process. Specifically, the playback server executes processes (710)-(716) in a while or continuous loop through each of the one or more network devices.

For each network device of the one or more network devices, the playback server can obtain a plurality of historical network traffic elements from the historical network traffic data associated with the network device (710). Specifically, in response to ranking or sorting each of the network data, the playback server can identify the historical network traffic elements from the obtained network data associated with a particular network device. The historical network traffic elements can include the ranked obtained network data associated with the particular network device.

For each network device, the playback server can obtain state transitional data for each historical network traffic element of the plurality of historical network traffic elements, wherein the state transitional data comprises (i) a timestamp and at least one of (ii) a prior state element or (iii) a next state element (712). As mentioned, each historical network traffic element can include a timestamp, a prior state value, and next state value, associated with the particular network device. For example, the timestamp may read "09:01:20 AM," the prior state value can include "20 MB" of network traffic activity, and the next state value can include "22 MB" of network traffic activity. In some implementations, a historical network traffic element may not include a prior state value. In this example, a historical network traffic element can include a timestamp of "10:10: 20 AM" and a next state value of "30 MB" of network traffic activity, without including a value for the prior state value.

The playback server can determine whether the state transitional data for each sorted historical network traffic element comprises the prior state element (714). In response to obtaining the network traffic data and state transitional data from each network traffic data, the playback server can analyze whether each network data for each network device includes a prior state value. By ensuring that each network data for each network device includes a prior state value, the playback server can ensure that the user can move backwards and forwards in time when viewing network playback activity on their respective client device.

In response to determining the state transitional data comprises the prior state element, the playback server can append the state transitional data to the network traffic playback data (716). For example, if the playback server determines that for each state transitional data associated with the historical network traffic data that a prior state value is included, then the playback server can append the state transitional data, e.g., the timestamp, the prior state value, and the next state value, to the network traffic playback data, which will ultimately be used for displaying the playback data to the client device for the user's review.

Alternatively, if the playback server determines that one or more of the state transitional data from the historical network traffic data for a particular network device does not include a prior state value, then the playback server can perform a search throughout the one or more connected databases for each of the missing prior state values for the state transitional data associated with network devices that were deemed missing. If the playback server identifies one or more missing prior state values for state transitional data associated with a network device that match to similar identified network devices from a prior date and time, then the playback server can combine the missing prior state values with the corresponding state transitional data that are missing prior state values for a respective network device. The playback server can iterate through this process until all of the prior state values have been identified and combined with the missing network data values.

However, if the playback server does not identify the prior state values from the one or more connected databases, then the playback server performs an additional process on each network data that is (i) missing the prior state value and (ii) a prior state value was not found from the search. Specifically, the playback server can copy the next state value to a prior state value for state transitional data that does not include the prior state value and only includes the next state value. In this case, the state transitional data will include a prior state value and a next state value as the same data components. Once the playback server has either found a prior state value or copied the next state value to the missing prior state value, the playback server is ready to provide the network visual playback data to the client device 104.

The playback server can filter the network traffic playback data using the extracted data from the query (718). In response to performing the forward reverse delta encoding process, the playback server can compare the results to the time range extracted from the request. For example, the playback server can compare the timestamps in the network traffic playback data generated by the forced reversed delta encoding process to the time range identified in the request. If any of the timestamps fall outside of the time range extracted from the request, then the playback server discard those specific network traffic playback data elements from the network traffic playback data. Alternatively, the network traffic playback data elements from the network traffic playback data that are within the time range identified in the request are added to a data ticker.

The playback server can provide the filtered network traffic playback data to the client device for multidirectional visual playback (720). Specifically, the data ticker can be a software module that includes one or more software components for displaying network playback data to the or on the client device. The data ticker also includes functionality that enables a user to interact with the network playback data on the client device. Specifically, the data ticker enables a user to control the movement of the network playback data, e.g., forward or backward, as well as the speed at which the playback data moves forward and backward. The network traffic data to be displayed can include, for example, traceroute activity, network latency, network speeds, and network bandwidth.

In some implementations, the data ticker displays imagery of the network playback data by reading the prior state value and the next state value of one or more corresponding network devices. The data ticker can display images and or videos illustrative of the prior state and next state values. Similarly, the data ticker can display images or videos based on the user 102's selection of moving forward or backward through the state values of the data stream. The data ticker can either move forward in time by incrementing a pointer that is currently set to the state being displayed. In response, the data ticker can move forward from a prior state value to a next state value and a next state value to a subsequent prior state value. Similarly, the data ticker can move in reverse from a prior state value to a previous next state value, and the previous next state value to the previous prior state value.

For example, the user can view the network data components on the client device. The user can view the network data components on the data ticker of their client device over a prior period of time identified by the user's submitted request. The data ticker can adjust the displayed network traffic playback data based on the received user input by fast forwarding the data ticker from the user interface to a view a different state of the network devices at a later point in time. Similarly, the user can rewind the data ticker from the user interface to view a different state of the network devices at a previous point in time. Moreover, the user can set a forward speed and a backward speed for scrubbing through the displayed network data.

In some implementations, the data ticker can determine whether interpolation is required based on an amount of transition between a prior state and a next state of a historical network traffic element of the displayed network traffic data. For instance, the data ticker analyzes both the prior state value and the next state value associated with the time indicated by the pointer. The data ticker can determine if the prior state value and the next state value differ by a threshold amount, then the data ticker can proceed to perform an interpolation. Alternatively, if the prior state value and the next state value do not differ by the threshold amount, then the data ticker does not perform an interpolation. An interpolation is performed to ensure that a sharp difference between a prior state value and a next state value is not displayed. An implementer of this system can set a threshold value. In some implementations, the threshold value can be learned over time based on feedback received from the user.

In some implementations, the data ticker can perform interpolation to reduce the sharp difference between the prior state value and the next state value. For example, the data ticker can interpolate by creating additional states that illustrate a gradual change between the prior state and the next state for that particular network data component. The data ticker can create additional data sets that have prior state values and next state values that are less than the threshold. The data sets are created to (i) have a difference of less than the threshold between the prior state value and the next state value and (ii) create contiguous data sets between the original prior state value. The difference or delta between each state value in a data set can be any delta, so long as the delta is less than the threshold.

In response to performing interpolation or not performing interpolation, that data ticker can apply different geographical features to the network data elements being displayed. The different geographical features can included data relating to weather, lightning strikes, forest fires, wind speed, temperature, and earthquakes, to name a few examples. The geographical features can also include data relating to satellite orbits and power outage, which can be mapped against the network data. The data ticker can overlay the different geographical features during the display of the data element to aid the user's visual in potentially understanding a context of the network activity.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, a data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatuses, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatuses.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, by a server and from a client device, a query for network traffic playback data of multiple network devices;
extracting, by the server, data from the query that characterizes prior network traffic for the multiple network devices;
obtaining, by the server, network traffic data associated with the multiple network devices;
generating, by the server, the network traffic playback data using (i) state value pairs of the network traffic data having values that differ by at least a particular amount and (ii) the extracted data from the query by:
for each given network device among one or more of the multiple network devices:
obtaining, by the server, a first data element from the network traffic data associated with the given network device, wherein the first data element specifies, for the given network device, a first timestamp and at least a first next state value indicative of a state of the given network device at a first time represented by the first timestamp;
determining, by the server, that the first data element includes (i) the first next state value and (ii) a first prior state value that differs from the first next state value by at least a particular amount, wherein the first prior state value is indicative of a first prior state of the given network device prior to the first time represented by the first timestamp; and
in response to determining that the first data element includes (i) the first next state value and (ii) the first prior state value that differs from the first next state value by at least a particular amount, appending, by the server, the first data element to the network traffic playback data;
filtering, by the server, the network traffic playback data using the extracted data from the query; and
providing, by the server, the filtered network traffic playback data to the client device, wherein inclusion, in the first data element, of the first prior state value indicative of the first prior state of the given network device prior to the first time represented by the first timestamp enables reverse visual playback of the playback data.

2. The computer-implemented method of claim 1, wherein the data from the query comprises one or more of locational data, an identifier for each of the multiple network devices, or a time range.

3. The computer-implemented method of claim 2, wherein the time range comprises a prior period that includes a predetermined length of time prior to a current time of the query.

4. The computer-implemented method of claim 1, further comprising:
   obtaining, by the server, a set of data elements including the first data element and multiple other data elements from the network traffic data associated with the given network device, wherein each of the multiple other data elements includes a timestamp representing a time when a next state value included in the data element was obtained;
   sorting, by the server, the set of data elements by a first characteristic.

5. The computer-implemented method of claim 1, further comprising:
   determining that a second data element, having a second timestamp, includes a second next state value indicative of the state of the given network device at a second time represented by the second timestamp, but does not include a second prior state value indicative of a second prior state of the given network device prior to the second time represented by the second timestamp; and
   in response to determining that the second data element does not include the second prior state value:
      searching, by the server, other data elements for the second prior state value indicative of the second prior state of the given network device prior to the second time represented by the second timestamp, wherein each of the other data elements specify corresponding next states of the given network device at different times represented by different timestamps;
      in response to determining that the other data elements do not include the second prior state value:
         copying, by the server, the second next state value of the second data element to the second prior state value of the second data element; and
         appending, by the server, the second data element, including the second next state value copied to the prior second state value of the second data element, to the network traffic playback data.

6. The computer-implemented method of claim 1, further comprising:
   determining that a second data element, having a second timestamp, includes a second next state value indicative of the state of the given network device at a second time represented by the second timestamp, but does not include a second prior state value indicative of a second prior state of the given network device prior to the second time represented by the second timestamp; and
   in response to determining that the second data element does not include a second prior state value:
      searching, by the server, other data elements for the second prior state value indicative of the second prior state of the given network device prior to the second time represented by the second timestamp, wherein each of the other data elements specify corresponding next states of the given network device at different times represented by different timestamps;
      in response to determining that one of the other data elements does include the second prior state value:
         copying, by the server, the prior state value from the one of the other data elements to the second data element; and
         appending, by the server, the second data element, including the prior state value copied to the prior second state value of the second data element, to the network traffic playback data.

7. The computer-implemented method of claim 1, further comprising:
   displaying, by the server, the filtered network traffic playback data to the client device;
   receiving, by the client device, user input that specifies a direction to move the displayed network traffic playback data, wherein the direction specified by the user input comprises a decrement in time of the filtered network traffic playback data;
   adjusting, by the client device, the displayed network traffic playback data based on the received user input, including presenting the network traffic data in reverse based on the user input specifying a decrement in time;
   determining, by the client device, whether interpolation is required for a given state transition based on an amount of transition between a given prior state value and a given next state value of one or more data elements in the displayed network traffic playback data; and
   in response to determining that interpolation is not required for the first state transition, displaying, by the client device, a current state value of the displayed network traffic playback data.

8. The computer-implemented method of claim 7, wherein determining whether interpolation for the first state transition is required based on the amount of transition between the given prior state value and the given next state value of the one or more data elements in the displayed network traffic playback data comprises:
   comparing, by the client device, the amount of transition between the given prior state value and the given next state value of the element to a threshold value; and
   in response to determining that the amount of transition does not satisfy the threshold value, determining, by the client device, that interpolation is not required.

9. The computer-implemented method of claim 8, further comprising:
   determining that interpolation is required for a second state transition;
   in response to determining that interpolation is required for the second state transition, determining, by the client device and for the second state transition, a set number of states between a second prior state and a second next state of the network traffic element; and
   displaying, by the client device, the set number of states between the second prior state and the second next state for the network traffic element.

10. The computer-implemented method of claim 1, wherein the filtered network traffic playback data is configured to be played in a forward manner, a backward manner, a forward speed, and a backward speed.

11. The computer-implemented method of claim 1, wherein the filtered network traffic playback data include one or more of traceroute activity, network latency, network speeds, and network bandwidth.

12. The computer-implemented method of claim 1, wherein the filtered network traffic playback data include one or more of wind speed data, temperature data, fire data, earthquake data, lightning strike data, power outage data, satellite orbit data, or other geological data.

13. A system comprising:
one or more computers and one or more storage devices storing instructions that are operable, when executed by the one or more computers, to cause the one or more computers to perform operations comprising:
receiving a query for network traffic playback data of multiple network devices;
extracting data from the query that characterizes prior network traffic for the multiple network devices;
obtaining network traffic data associated with the multiple network devices;
generating the network traffic playback data using (i) state value pairs of the network traffic data having values that differ by at least a particular amount and (ii) the extracted data from the query by:
for each given network device among one or more of the multiple network devices:
obtaining a first data element from the network traffic data associated with the given network device, wherein the first data element specifies, for the given network device, a first timestamp and at least a first next state value indicative of a state of the given network device at a first time represented by the first timestamp;
determining that the first data element includes (i) the first next state value and (ii) a first prior state value that differs from the first next state value by at least a particular amount, wherein the first prior state value is indicative of a first prior state of the given network device prior to the first time represented by the first timestamp; and
in response to determining that the first data element includes (i) the first next state value and (ii) the first prior state value that differs from the first next state value by at least a particular amount, appending the first data element to the network traffic playback data;
filtering the network traffic playback data using the extracted data from the query; and
providing the filtered network traffic playback data to a client device, wherein inclusion, in the first data element, of the first prior state value indicative of the first prior state of the given network device prior to the first time represented by the first timestamp enables reverse visual playback of the playback data.

14. The system of claim 13, wherein the data from the query comprises one or more of locational data, an identifier for each of the multiple network devices, or a time range.

15. The system of claim 14, wherein the time range comprises a prior period that includes a predetermined length of time prior to a current time of the query.

16. The system of claim 13, wherein the instructions cause the one or more computers to perform operations further comprising:
obtaining a set of data elements including the first data element and multiple other data elements from the network traffic data associated with the given network device, wherein each of the multiple other data elements includes a timestamp representing a time when a next state value included in the data element was obtained;
sorting the set of data elements by a first characteristic.

17. The system of claim 13, wherein the instructions cause the one or more computers to perform operations further comprising:
determining that a second data element, having a second timestamp, includes a second next state value indicative of the state of the given network device at a second time represented by the second timestamp, but does not include a second prior state value indicative of a second prior state of the given network device prior to the second time represented by the second timestamp; and
in response to determining that the second data element does not include the second prior state value:
searching other data elements for the second prior state value indicative of the second prior state of the given network device prior to the second time represented by the second timestamp, wherein each of the other data elements specify corresponding next states of the given network device at different times represented by different timestamps;
in response to determining that the other data elements do not include the second prior state value:
copying the second next state value of the second data element to the second prior state value of the second data element; and
appending the second data element, including the second next state value copied to the prior second state value of the second data element, to the network traffic playback data.

18. The system of claim 13, wherein the instructions cause the one or more computers to perform operations further comprising:
determining that a second data element, having a second timestamp, includes a second next state value indicative of the state of the given network device at a second time represented by the second timestamp, but does not include a second prior state value indicative of a second prior state of the given network device prior to the second time represented by the second timestamp; and
in response to determining that the second data element does not include a second prior state value:
searching other data elements for the second prior state value indicative of the second prior state of the given network device prior to the second time represented by the second timestamp, wherein each of the other data elements specify corresponding next states of the given network device at different times represented by different timestamps;
in response to determining that one of the other data elements does include the second prior state value:
copying the prior state value from the one of the other data elements to the second data element; and
appending the second data element, including the prior state value copied to the prior second state value of the second data element, to the network traffic playback data.

19. The system of claim 13, wherein the instructions cause the one or more computers to perform operations further comprising:
displaying the filtered network traffic playback data to the client device;
receiving user input that specifies a direction to move the displayed network traffic playback data, wherein the direction specified by the user input comprises a decrement in time of the filtered network traffic playback data;

adjusting the displayed network traffic playback data based on the received user input, including presenting the network traffic data in reverse based on the user input specifying a decrement in time;

determining whether interpolation is required for a given state transition based on an amount of transition between a given prior state value and a given next state value of one or more data elements in the displayed network traffic playback data; and in response to determining that interpolation is not required for the first state transition, displaying a current state value of the displayed network traffic playback data.

20. The system of claim 13, wherein the filtered network traffic playback data include one or more of wind speed data, temperature data, fire data, earthquake data, lightning strike data, power outage data, satellite orbit data, or other geological data.

21. A non-transitory computer-readable medium storing software comprising instructions executable by one or more computers which, upon such execution, cause the one or more computers to perform operations comprising:

receiving a query for network traffic playback data of multiple network devices;

extracting data from the query that characterizes prior network traffic for the multiple network devices;

obtaining network traffic data associated with the multiple network devices;

generating the network traffic playback data using (i) state value pairs of the network traffic data having values that differ by at least a particular amount and (ii) the extracted data from the query by:

for each given network device among one or more of the multiple network devices:

obtaining a first data element from the network traffic data associated with the given network device, wherein the first data element specifies, for the given network device, a first timestamp and at least a first next state value indicative of a state of the given network device at a first time represented by the first timestamp;

determining that the first data element includes (i) the first next state value and (ii) a first prior state value that differs from the first next state value by at least a particular amount, wherein the first prior state value is indicative of a first prior state of the given network device prior to the first time represented by the first timestamp; and in response to determining that the first data element includes (i) the first next state value and (ii) the first prior state value that differs from the first next state value by at least a particular amount, appending the first data element to the network traffic playback data;

filtering the network traffic playback data using the extracted data from the query; and providing the filtered network traffic playback data to a client device, wherein inclusion, in the first data element, of the first prior state value indicative of the first prior state of the given network device prior to the first time represented by the first timestamp enables reverse visual playback of the playback data.

* * * * *